(12) United States Patent
Kim et al.

(10) Patent No.: US 11,054,644 B2
(45) Date of Patent: Jul. 6, 2021

(54) ELECTRONIC DEVICE AND METHOD FOR CONTROLLING ELECTRONIC DEVICE

(71) Applicant: Samsung Electronics Co., Ltd., Gyeonggi-do (KR)

(72) Inventors: Hyun Kyung Kim, Seoul (KR); Hye Jin Lee, Gyeonggi-do (KR); Eun Young Lim, Seoul (KR); Joo Hee Park, Seoul (KR); Seon Woo Yoo, Seoul (KR)

(73) Assignee: Samsung Electronics Co., Ltd

( * ) Notice: Subject to any disclaimer, the term of this patent is extended or adjusted under 35 U.S.C. 154(b) by 97 days.

(21) Appl. No.: 16/475,316

(22) PCT Filed: Jan. 10, 2018

(86) PCT No.: PCT/KR2018/000542
§ 371 (c)(1),
(2) Date: Jul. 1, 2019

(87) PCT Pub. No.: WO2018/139786
PCT Pub. Date: Aug. 2, 2018

(65) Prior Publication Data
US 2021/0072541 A1    Mar. 11, 2021

(30) Foreign Application Priority Data

Jan. 25, 2017 (KR) ........................ 10-2017-0011924

(51) Int. Cl.
*G06F 3/16* (2006.01)
*G02B 27/01* (2006.01)
*G06F 3/01* (2006.01)

(52) U.S. Cl.
CPC ....... *G02B 27/017* (2013.01); *G02B 27/0179* (2013.01); *G06F 3/01* (2013.01); *G06F 3/16* (2013.01); *G02B 2027/014* (2013.01)

(58) Field of Classification Search
CPC .. G06F 2203/04803; G06F 3/167; G06F 3/16; G06F 3/012; G06F 3/01;
(Continued)

(56) References Cited

U.S. PATENT DOCUMENTS 6,845,338 B1    1/2005 Willins et al.
7,130,759 B2    10/2006 Willins et al.
(Continued)

FOREIGN PATENT DOCUMENTS

JP    2016048534    4/2016
KR    101381396    4/2014
(Continued)

OTHER PUBLICATIONS

PCT/ISA/210 Search Report issued on PCT/KR2018/000542, pp. 5.
PCT/ISA/237 Written Opinion issued on PCT/KR2018/000542, pp. 4.

*Primary Examiner* — Duc Q Dinh
(74) *Attorney, Agent, or Firm* — The Farrell Law Firm, P.C.

(57) ABSTRACT

Disclosed is an electronic apparatus. The electronic apparatus includes a display, at least one speaker, a communication module, and at least one processor. The at least one processor is configured to receive information about a region displayed by an external electronic apparatus playing the same image as an image played on the display by the electronic apparatus, in the image via the communication module, to receive voice data generated by the external electronic apparatus, via the communication module, and to adjust an output of the speaker based on a distance difference between a region displayed by the external electronic apparatus and a region displayed on the display by the electronic apparatus to control the voice data to be played. In addition, various other embodiments are possible.

15 Claims, 17 Drawing Sheets

(58) Field of Classification Search
CPC ....... G06F 3/04847; G06F 2203/04806; G06F 3/04842; G06F 3/165; G06F 16/29; G06F 1/1605; G06F 1/1632; G06F 3/14; G06F 3/147; H04N 5/77; H04N 21/00; H04N 21/24; H04N 21/42203; H04N 21/42204; H04N 21/43; H04N 21/442; H04N 21/44204; H04N 21/44213; H04N 21/47; H04N 21/472; H04N 2007/145; H04N 21/44218; H04N 7/147; H04N 1/00307; H04N 21/4661; H04N 7/188; G02B 27/017; G02B 27/0179; G02B 2027/014
USPC ...................... 345/1.1, 1.2, 1.3, 2.1, 2.2, 2.3
See application file for complete search history.

(56) References Cited

U.S. PATENT DOCUMENTS

| | | | |
|---|---|---|---|
| 8,831,255 | B2 | 9/2014 | Crawford et al. |
| 9,374,549 | B2* | 6/2016 | Cho .......................... H04S 7/30 |
| 2003/0223602 | A1* | 12/2003 | Eichler .................. H04S 3/004 |
| | | | 381/309 |
| 2014/0118631 | A1 | 5/2014 | Cho |
| 2014/0181657 | A1* | 6/2014 | Chang .................. H04N 21/439 |
| | | | 715/716 |
| 2015/0130727 | A1* | 5/2015 | Kim ................. H04N 21/42224 |
| | | | 345/173 |
| 2015/0222780 | A1* | 8/2015 | Lee .................... H04N 5/23293 |
| | | | 348/231.99 |
| 2016/0134938 | A1 | 5/2016 | Miyazaki et al. |
| 2016/0379660 | A1* | 12/2016 | Wright ................ H04R 29/008 |
| | | | 381/57 |

FOREIGN PATENT DOCUMENTS

| | | |
|---|---|---|
| KR | 1020140054611 | 5/2014 |
| KR | 101595831 | 2/2016 |
| KR | 1020160013853 | 2/2016 |
| KR | 1020160099981 | 8/2016 |

\* cited by examiner

ELECTRONIC DEVICE AND METHOD FOR CONTROLLING ELECTRONIC DEVICE

PRIORITY

This application is a National Phase Entry of PCT International Application No. PCT/KR2018/000542 which was filed on Jan. 11, 2018, and claims priority to Korean Patent Application No. 10-2017-0011924, which was filed on Jan. 25, 2017, the content of each of which is incorporated herein by reference.

TECHNICAL FIELD

Various embodiments of the disclosure relate to an apparatus that displays an image and outputs audio by using an electronic apparatus, and an operating method thereof.

BACKGROUND ART

In recent years, as wearable image displaying devices such as head mounted display (HMD) devices are widely commercialized, the content such as an image having the angle of view of 360 degrees is increasing.

Furthermore, it is also possible to watch an image having the angle of view of 360 degrees at locations where a lot of people are spaced from each other. Accordingly, there is a need for an optimized operating environment such as an environment in which a lot of people watch a 360-degree image in one real space.

DISCLOSURE

Technical Problem

While users watch an image having the angle of view of 360 degrees at different locations at the same time, the users may have a conversation by using a microphone, a speaker, or the like that is connected to or is included in the electronic apparatus.

In this case, because the voice of the counterpart is always output identically even when the users watch regions different from one another, it is difficult for the users to feel the sense of presence.

In the disclosure, an electronic apparatus may differently adjust the output of a voice based on the difference between regions displayed in a 360-degree image, thereby providing a controlling method that provides a user with the sense of presence, and an electronic apparatus supporting the same.

Technical Solution

According to an embodiment, an electronic apparatus may include a display, at least one speaker, a communication module, and at least one processor electrically connected to the display, the speaker, and the communication module. The at least one processor may be configured to receive information about a region displayed by an external electronic apparatus playing the same image as an image played on the display by the electronic apparatus, in the image via the communication module, to receive voice data generated by the external electronic apparatus, via the communication module, and to adjust an output of the speaker based on a distance difference between a region displayed by the external electronic apparatus and a region displayed on the display by the electronic apparatus to control the voice data to be played.

According to an embodiment, a controlling method of an electronic apparatus may include receiving information about a region displayed by an external electronic apparatus playing the same image as an image played by the electronic apparatus, in the image, receiving voice data generated by the external electronic apparatus, and adjusting and playing an output of the received voice data based on a distance difference between a region displayed by the external electronic apparatus and a region displayed on a display by the electronic apparatus.

According to an embodiment, a recording medium may store instructions performing a controlling method of an electronic apparatus. The instructions may include receiving information about a region displayed by an external electronic apparatus playing the same image as an image played by the electronic apparatus, in the image, receiving voice data generated by the external electronic apparatus, and adjusting and playing an output of the received voice data based on a distance difference between a region displayed by the external electronic apparatus and a region displayed on a display by the electronic apparatus.

Advantageous Effects

According to various embodiments, an electronic apparatus may receive information about the region displayed by an external electronic apparatus playing the same image as the image played by an electronic apparatus, may receive voice data generated by the external electronic apparatus, and may adjust the output of the received voice data based on the distance difference between a region displayed by the external electronic apparatus and a region displayed by the electronic apparatus, thereby providing an effect the same as an effect that users are gathered in a virtual space and watch the same image together even though the users watch the same image at locations different from one another.

MODE FOR INVENTION

Figure 1A:
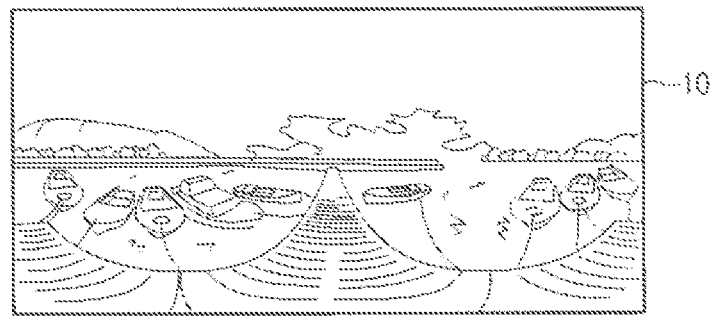
FIGS. 1AA to 1DB are views for describing situations of adjusting the output of a speaker based on the difference between the display region of an electronic apparatus and the region displayed by an external electronic apparatus playing the same image, according to an embodiment.
Figure 1A:
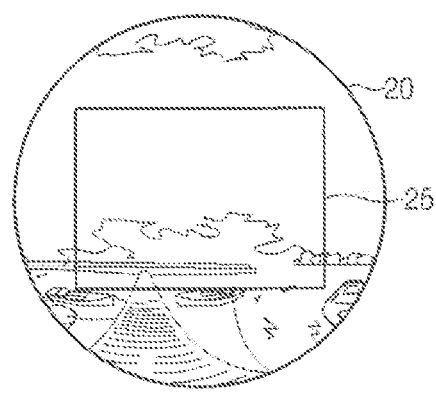
Figure 1A:
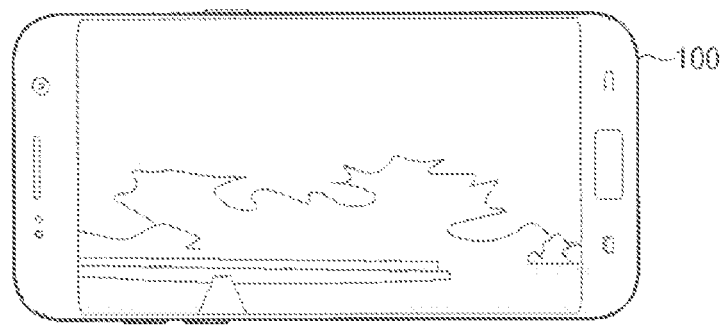

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various components regardless of the order and/or the priority and to distinguish the relevant components from other components, but do not limit the components. When an component (e.g., a first component) is referred to as being "(operatively or communicatively) coupled with/to" or "connected to" another component (e.g., a second component), the component may be directly coupled with/to or connected to the other component or an intervening component (e.g., a third component) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

FIGS. 1AA to 1DB are views for describing situations of adjusting the output of a speaker based on the difference between the display region of an electronic apparatus and the region displayed by an external electronic apparatus playing the same image, according to an embodiment.

FIG. 1AA to FIG. 1AC illustrate views for describing a situation in which a 360-degree image is generated and is adjusted to be displayed in an electronic apparatus.

Referring to FIG. 1AA to FIG. 1AC, an electronic apparatus 100 may display 360 content, for example, a 360-degree image. For example, the electronic apparatus 100 according to an embodiment may include, for example, at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a medical device, a camera, or a wearable device. The wearable device may include at least one of an accessory-type device (e.g., a timepiece, a ring, a bracelet, an anklet, a necklace, glasses, a contact lens, or a head-mounted device (HMD)), one-piece fabric or clothes type device (e.g., electronic clothes), a body-attached type device (e.g., a skin pad or a tattoo), or a bio-implantable type device (e.g., implantable circuit).

According to an embodiment, an electronic apparatus may include at least one of, for example, televisions (TVs), digital video disk (DVD) players, audios, refrigerators, air cleaners, set-top boxes, home automation control panels, security control panels, media boxes (e.g., Samsung HomeSync™, Apple TV™, or Google TV™), game consoles (e.g., Xbox™ and PlayStation™), electronic dictionaries, electronic keys, camcorders, mirrors, or electronic picture frames.

Referring to FIG. 1AA, a 360-degree image 10 in a planar form may be an image having the angle of view of 360 degrees. For example, the 360-degree image 10 in a planar form may be the image generated based on a plurality of images captured in the 360-degree direction using at least one camera. The captured plurality of images may be mapped to a sphere, and the contact points of the mapped images may be connected (stitched) to generate a 360-degree image 20 of a sphere type (e.g., the 360-degree image of a sphere type 20 of FIG. 1AB). As illustrated in FIG. 1AA, the 360-degree image 20 of a sphere type may be converted to the 360-degree image 10 in a planar form, so as to be transmitted to another device or stored.

Referring to FIG. 1AB, the electronic apparatus 100 (e.g., the electronic apparatus 100 of FIG. 1AC) according to various embodiments may perform graphic processing on the 360-degree image 10 in a planar form (e.g., the 360-degree image 10 in a planar form of FIG. 1AB) to convert the 360-degree image 10 in a planar form to the 360-degree image 20 of a sphere type. For example, the electronic apparatus 100 may generate the 360-degree image 20 of a sphere type by mapping the 360-degree image 10 in a planar form to the sphere.

Figure 1B:
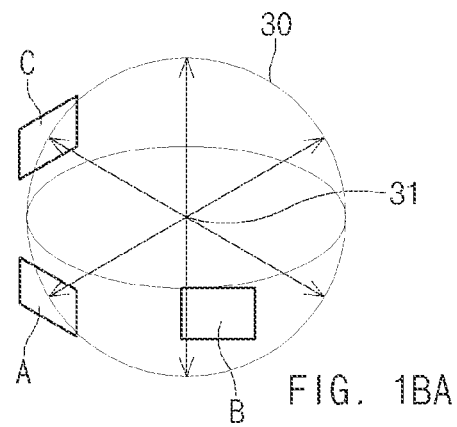
Figure 1B:
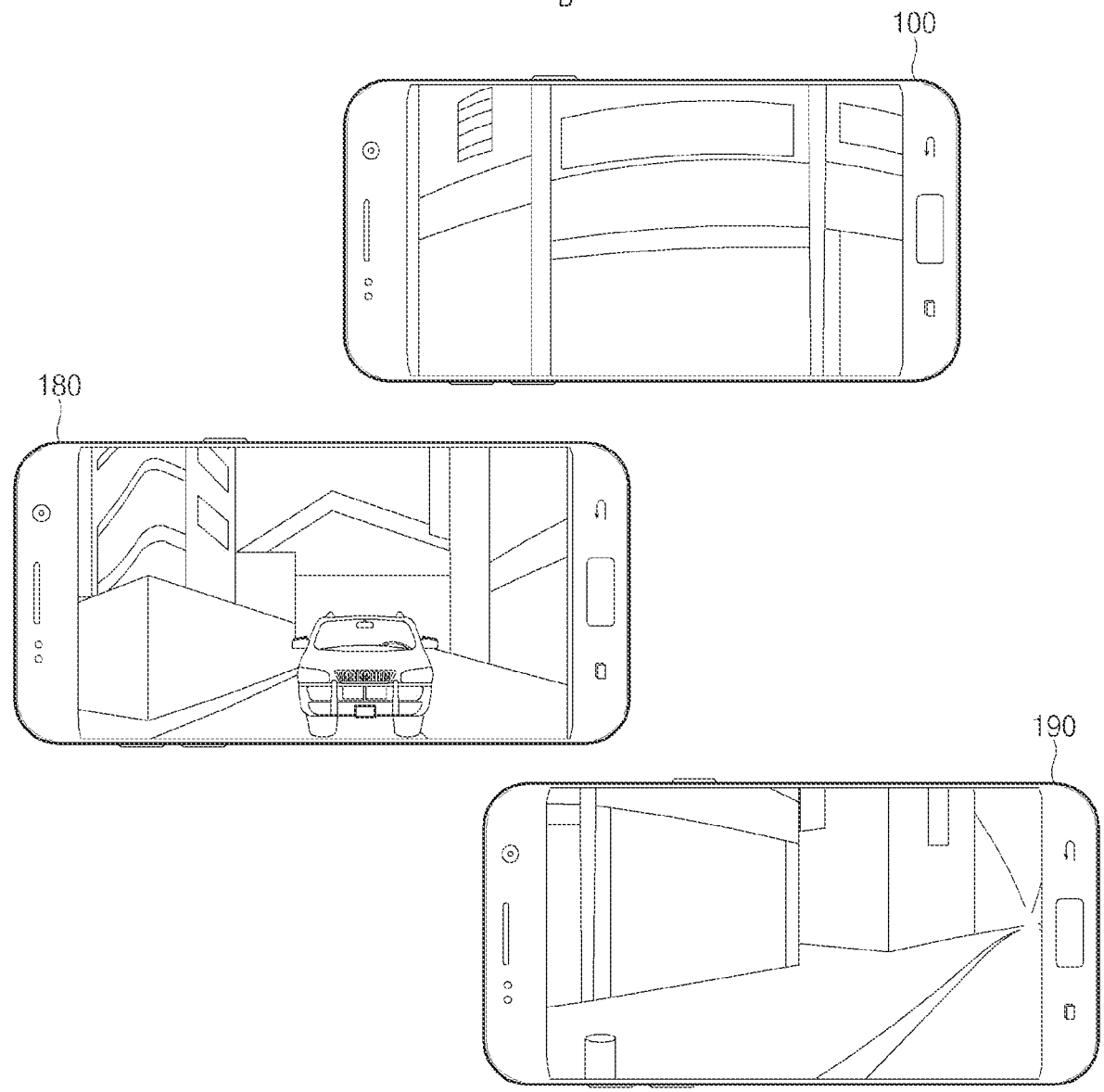
Figure 1C:
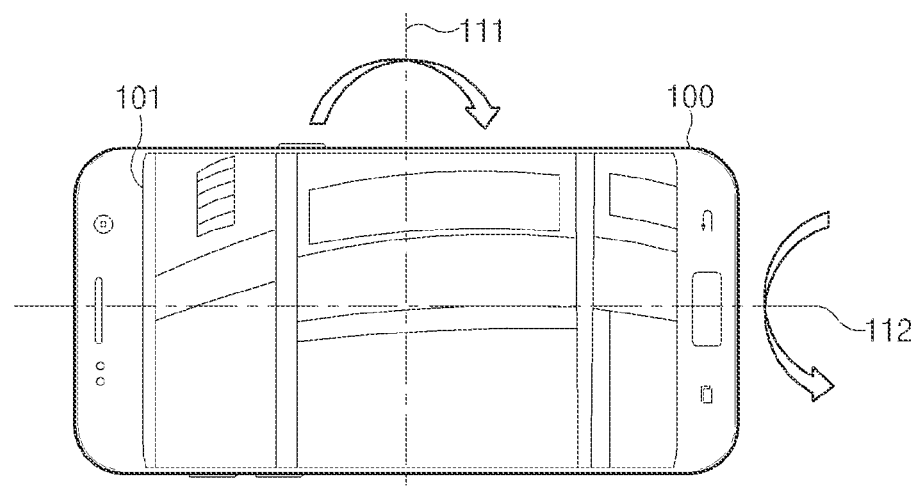
Figure 1C:
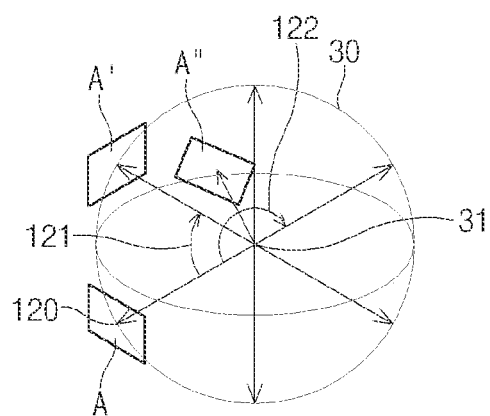
Figure 1C:
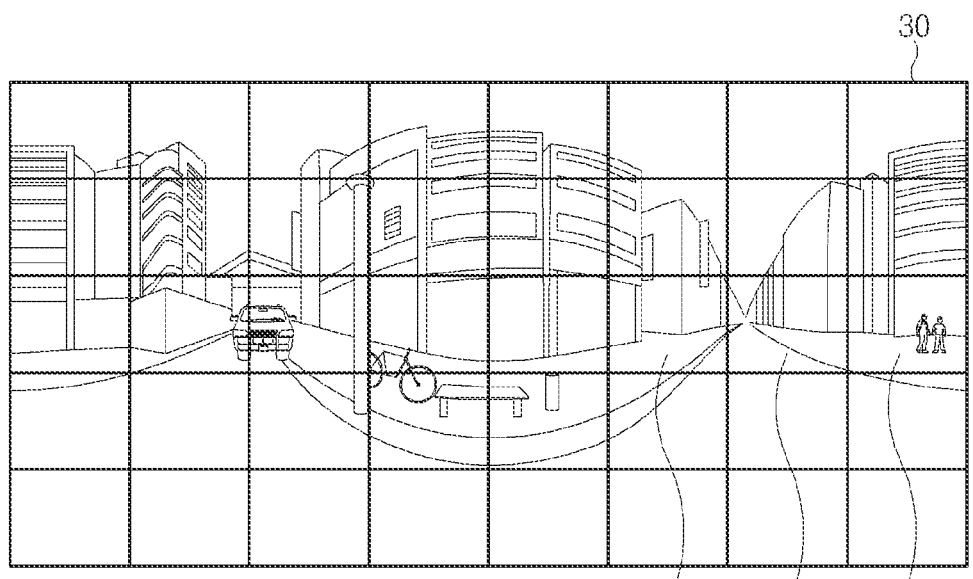

Referring to FIG. 1AC, the electronic apparatus 100 may select a partial region 25 in the 360-degree image 20 of a sphere type (e.g., the 360-degree image of a sphere type 20 of FIG. 1AB) and then may display an image corresponding to the selected partial region 25 (e.g., the selected partial region 25 of FIG. 1AB) on a display 101 (e.g., the display 101 of FIG. 1CA). The electronic apparatus 100 may perform image quality processing on the image corresponding to the selected region 25 and may display the processed image on the display 101.

According to various embodiments, the electronic apparatus 100 may be integrated with the display 101 and may be implemented separately from the display 101 to display an image through wire/wireless communication, on the display that is remotely located with respect to the electronic apparatus 100.

According to various embodiments, the electronic apparatus 100 may be controlled by a control device. For example, the control device may be implemented with various types of devices for controlling the electronic apparatus 100, such as a remote controller, a smartphone, or the like.

According to various embodiments, the control device may control the electronic apparatus 100, using short range communication such as infrared or Bluetooth. The control device may control the function of the electronic apparatus 100, using at least one of a provided key (including a button), a touch pad, a microphone capable of receiving a user's voice, a sensor capable of recognizing the motion of the control device, or another electronic apparatus (e.g., a smart watch, a smart phone, or the like).

According to various embodiments, the image played by the electronic apparatus 100 is not limited to a 360-degree image. For example, the electronic apparatus 100 may play a panorama image. For example, the panorama image may be an image generated based on a plurality of images that are captured using at least one camera while the capture direction is changed. The panorama image may be generated in the manner similar to the 360-degree image described above, but there may be various capture angles of view such as 30 degrees, 90 degrees, 180 degrees, or the like. Moreover, the electronic apparatus 100 may play a planar image having a fixed capture angle of view. Hereinafter, it is assumed that the electronic apparatus 100 plays a 360-degree image.

FIG. 1BA to 1BB illustrate views for describing a situation in which an electronic apparatus and external electronic apparatuses play the same 360-degree image, according to an embodiment.

FIG. 1BA may indicate the location of a region, which an electronic apparatus and external electronic apparatuses display, in a 360-degree image 30.

Referring to FIG. 1BA and FIG. 1BB, each of the electronic apparatus 100 and a first external electronic apparatus 180, and a second external electronic apparatus 190 may display a partial region in the 360-degree image 30. For example, in the 360-degree image 30, the electronic apparatus 100 may display region A, the first external electronic apparatus 180 may display region B, and the second external electronic apparatus 190 may display region C. A user of the electronic apparatus 100, a user of the first external electronic apparatus 180, and the user of the second external electronic apparatus 190 may experience an effect similar to an effect that the users watch display regions (region A, region B, and region C) at a center point 31 of the 360-degree image 30, respectively.

According to an embodiment, the electronic apparatus 100, the first external electronic apparatus 180, and the second external electronic apparatus 190 may play the same 360-degree image 30 substantially at the same time. For example, the electronic apparatus 100, the first external electronic apparatus 180, and the second external electronic apparatus 190 may set up communication, using a communication interface. Furthermore, another electronic apparatus such as a server or the like may be further included, and a network may be established.

According to an embodiment, the electronic apparatus 100, the first external electronic apparatus 180, and the second external electronic apparatus 190 may receive and play the 360-degree image 30 from another electronic apparatus such as a server or the like substantially at the same time. For example, the electronic apparatus 100, the first external electronic apparatus 180, and the second external electronic apparatus 190 may download and play the 360-degree image 30 in the form of streaming. For example, the 360-degree image may be the captured still image or may be a video captured in real time by using a 360 degree camera or the like, which is included in a server or is electrically connected to the server.

According to another embodiment, the electronic apparatus 100 may transmit an image, which is generated through a camera module included in the electronic apparatus 100, to the first external electronic apparatus 180 and the second external electronic apparatus 190. Furthermore, the electronic apparatus 100 may transmit the 360-degree image 30, which is received from the server and then is played, to the first external electronic apparatus 180, and the second external electronic apparatus 190 again. However, an embodiment is not limited thereto. There are various methods in each of which the electronic apparatus 100, the first external electronic apparatus 180, and the second external electronic apparatus 190 play the same image roughly at the same time.

Hereinafter, it is assumed that the electronic apparatus 100, the first external electronic apparatus 180, and the second external electronic apparatus 190 receive and play the 360-degree image 30 from a separate server that is set using the same network For example, the electronic apparatus 100, the first external electronic apparatus 180, and the second external electronic apparatus 190 may display only the partial region in the 360-degree image 30. For example, the partial region may be a region corresponding to the angle of view of about 90 degrees in the horizontal direction, in the 360-degree image 30. However, the area size of the partial region is not limited thereto.

According to an embodiment, when receiving and playing the 360-degree image 30 from the server, the electronic apparatus 100, the first external electronic apparatus 180, and the second external electronic apparatus 190 may display the same region or may display different regions.

For example, in the case where a region (or a point to be displayed as the starting point) to be always displayed as the starting point at a point in time when the 360-degree image 30 is played is designated as region A, all of the electronic apparatus 100, the first external electronic apparatus 180, and the second external electronic apparatus 190 may display region A.

According to another embodiment, in the case where the region to be always displayed as the starting point at a point in time when the 360-degree image 30 is played is not designated, the electronic apparatus 100, the first external electronic apparatus 180, and the second external electronic apparatus 190 may mainly display the region with a feature point focusing on the region, in the 360-degree image 30 to be played. For example, the electronic apparatus 100, the first external electronic apparatus 180, and the second external electronic apparatus 190 may select a region to be displayed as the starting point based on a region in which there are a lot of faces, a region that the most people watch in social networking service (SNS), a region in which there are a lot of edge components, or the like in the 360-degree image 30.

According to another embodiment, when the electronic apparatus 100 transmits an image to the first external electronic apparatus 180 and the second external electronic apparatus 190, the first external electronic apparatus 180, and the second external electronic apparatus 190 may display the region, which the electronic apparatus 100 currently displays, as a start screen. Alternatively, the first external electronic apparatus 180 and the second external electronic apparatus 190 may display the predetermined region, which is designated by electronic apparatus 100, as the start screen.

According to another embodiment, for example, the first external electronic apparatus 180 may display an outer region of the first end (e.g., left-side end) in the horizontal direction of region A displayed by the electronic apparatus 100; the second external electronic apparatus 190 may display an outer region of the second end (e.g., right-side end) in the horizontal direction of the region displayed by the electronic apparatus 100.

The electronic apparatus 100 according to an embodiment, the first external electronic apparatus 180, and the second external electronic apparatus 190 may include at least one or more sound input devices (e.g., microphones) and sound output devices (e.g., speakers).

The electronic apparatus 100 according to an embodiment, the first external electronic apparatus 180, and the second external electronic apparatus 190 may convert the voice entered via a microphone to voice data and then may transmit the voice data to other electronic apparatuses, using the above-described network. The electronic apparatus 100, the first external electronic apparatus 180, and the second external electronic apparatus 190 may output the received voice data via a speaker.

For example, after the first external electronic apparatus 180 receives the voice of a user via a microphone of the first external electronic apparatus 180 and then converts the voice into voice data, the first external electronic apparatus 180 may transmit the voice data to the electronic apparatus 100. The electronic apparatus 100 may output the received voice data via the speaker. For this reason, while users of the electronic apparatus 100, the first external electronic apparatus 180, and the second external electronic apparatus 190 watch the same 360-degree image 30 even though the users are positioned at locations geographically spaced from one another, the users may have a voice conversation with one another.

Furthermore, the electronic apparatus 100, the first external electronic apparatus 180, and the second external electronic apparatus 190 may adjust the output of the speaker, based on the difference between displayed regions. For example, the distance between region A and region B may be closer than the distance between region A and region C. Accordingly, the electronic apparatus 100 displaying region A may further increase and play the output of the voice received after being generated by the first external electronic apparatus 180 displaying region B than the voice received after being generated by the second external electronic apparatus 190 displaying region C.

According to another embodiment, the electronic apparatus 100 may include a first speaker (not illustrated) and a second speaker (not illustrated). The first speaker may be adjacent to the region displayed by the first external electronic apparatus 180; the second speaker may be adjacent to the region displayed by the second external electronic apparatus 190. In this case, with regard to the voice received after being generated by the first external electronic apparatus 180, the electronic apparatus 100 may adjust the output of the first speaker to be higher than the output of the second speaker and then may output the voice. Likewise, with regard to the voice received after being generated by the second external electronic apparatus 190, the electronic apparatus 100 may adjust the output of the second speaker to be higher than the output of the first speaker and then may output the voice.

As such, according to the above description, even though users of the electronic apparatus 100, the first external electronic apparatus 180, and the second external electronic apparatus 190 are positioned at locations geographically spaced from one another, the users may obtain an effect the same as an effect that the users are gathered and view the same 360-degree image 30 together in a single space set as a virtual space.

FIG. 1CA to 1CC illustrate views for describing a situation of changing a region displayed by an electronic apparatus and an external electronic apparatuses, according to an embodiment.

According to an embodiment, when the display region is changed, the electronic apparatus 100, the first external electronic apparatus 180 (e.g., the first external electronic apparatus 180 of FIG. 1BB), the second external electronic apparatus 190 (e.g., the second external electronic apparatus 190 of FIG. 1BB) may set that a user's viewpoint viewing each display region at the center point of the 360-degree image 30 is changed. The electronic apparatus 100, the first external electronic apparatus 180, and the second external electronic apparatus 190 may change the output of the voice received after being generated by another electronic apparatus, depending on a viewpoint change. Hereinafter, the electronic apparatus 100 will be described mainly.

According to an embodiment, the electronic apparatus 100 may change the display region, using various methods. For example, the electronic apparatus 100 may rotate or move to change the display region and may change the currently displayed region based on a user input (e.g., a touch and drag input, a physical key input, or the like).

The electronic apparatus 100 may recognize the direction of rotation and the amount of rotation, using a sensor or the like or may identify the moved location. For example, the electronic apparatus 100 may detect the above-described rotation or movement, using a sensor capable of sensing a posture such as a gesture sensor, a gyro sensor, an acceleration sensor, or the like.

Referring to FIG. 1CA, when the electronic apparatus 100 rotates or moves clockwise with respect to a first axis 111, the electronic apparatus 100 may display a region, which is positioned at the right side of a region displayed previously by detecting the rotation or movement of the electronic apparatus 100 by using the above-described sensors. In contrast, when the electronic apparatus 100 rotates or moves counterclockwise with respect to the first axis 111, the electronic apparatus 100 may display a region, which is positioned at the left side of a region displayed previously by detecting the rotation or movement of the electronic apparatus 100 by using the above-described sensors.

According to another embodiment, when the electronic apparatus 100 rotates or moves in the direction, in which the display 101 faces downwardly, with respect to a second axis 112, the electronic apparatus 100 may display a region, which is positioned at the up side of a region displayed previously by detecting the rotation or movement of the electronic apparatus 100 by using the above-described sensors. In contrast, when the electronic apparatus 100 rotates or moves in the direction, in which the display 101 faces upwardly, with respect to the second axis 112, the electronic apparatus 100 may display a region, which is positioned at the down side of a region displayed previously by detecting the rotation or movement of the electronic apparatus 100 by using the above-described sensors. The reference axis for rotating or moving the electronic apparatus 100 is not limited to the first axis 111 or the second axis 112.

Referring to FIG. 1CB, the electronic apparatus 100 (e.g., the electronic apparatus 100 of FIG. 1CA) may match the location change by rotation or movement, using coordinates. The electronic apparatus 100 may set a preset angular movement with respect to a reference axis 120, to one unit. For example, the electronic apparatus 100 may set the movement of 30 degrees, to 1 unit. However, the angle corresponding to 1 unit is not limited thereto.

For example, the coordinates of the electronic apparatus 100 displaying region A may be (0, 0) because the coordinates is placed at the reference axis 120. The coordinates of region A' that moves in the first direction (e.g., a horizontal planar direction 121) by 90 degrees with respect to the reference axis 120 in region A may be (3, 0). The coordinates of region A" that moves in the second direction (e.g., a vertical direction 122) by 60 degrees with respect to the reference axis 120 may be (0, 2).

According to another embodiment, the electronic apparatus 100 may divide the 360-degree image 30 into a plurality of regions and may identify the change of the region displayed by the electronic apparatus 100, based on displaying the divided regions. When the display region is changed, the electronic apparatus 100 may set that a user's viewpoint facing the display region at the center point of the 360-degree image 30 is changed and may change the output of voice received from the external electronic apparatus, depending on the difference between a viewpoint provided by the electronic apparatus 100 and a viewpoint provided by the first external electronic apparatus (e.g., the first external electronic apparatus 180 of FIG. 1BB) and/or the second external electronic apparatus(e.g., the second external electronic apparatus 190 of FIG. 1BB).

For example, referring to FIG. 1CC, the electronic apparatus 100 (e.g., the electronic apparatus 100 of FIG. 1CA) may display a third region 133 via a second region 132, while displaying a first region 131. In this case, the output of the speaker received after being generated by the first external electronic apparatus(e.g., the first external electronic apparatus 180 of FIG. 1BB) and/or the second external electronic apparatus(e.g., the second external electronic apparatus 190 of FIG. 1BB) may be changed depending on the difference between the viewpoint provided by the electronic apparatus 100 and the viewpoint provided by the first external electronic apparatus 180 and/or the second external electronic apparatus 190, by setting the user's viewpoinot facing the first region 131 at the center point of the 360-degree image 30, as facing the third region 133.

According to another embodiment, the electronic apparatus 100 may change the display region based on a user input (e.g., a touch and drag input, a physical key input, or the like). In this case, the electronic apparatus 100 may set that the user's viewpoint facing the display region at the center point of the 360-degree image 30 is changed and may change the output of voice received from the first external electronic apparatus 180 and/or the second external electronic apparatus 190, depending on the difference between a viewpoint provided by the electronic apparatus 100 and a viewpoint provided by the first external electronic apparatus 180 and/or the second external electronic apparatus 190.

Figure 1D:
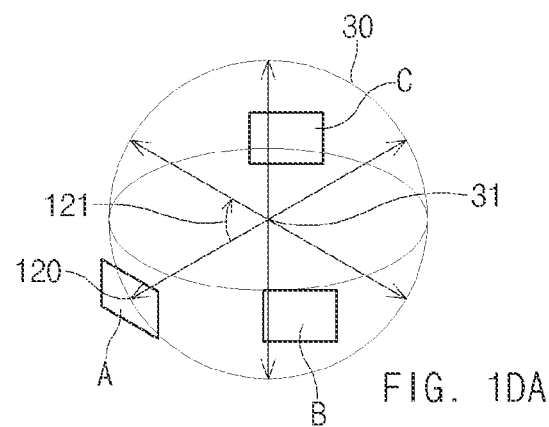
Figure 1D:
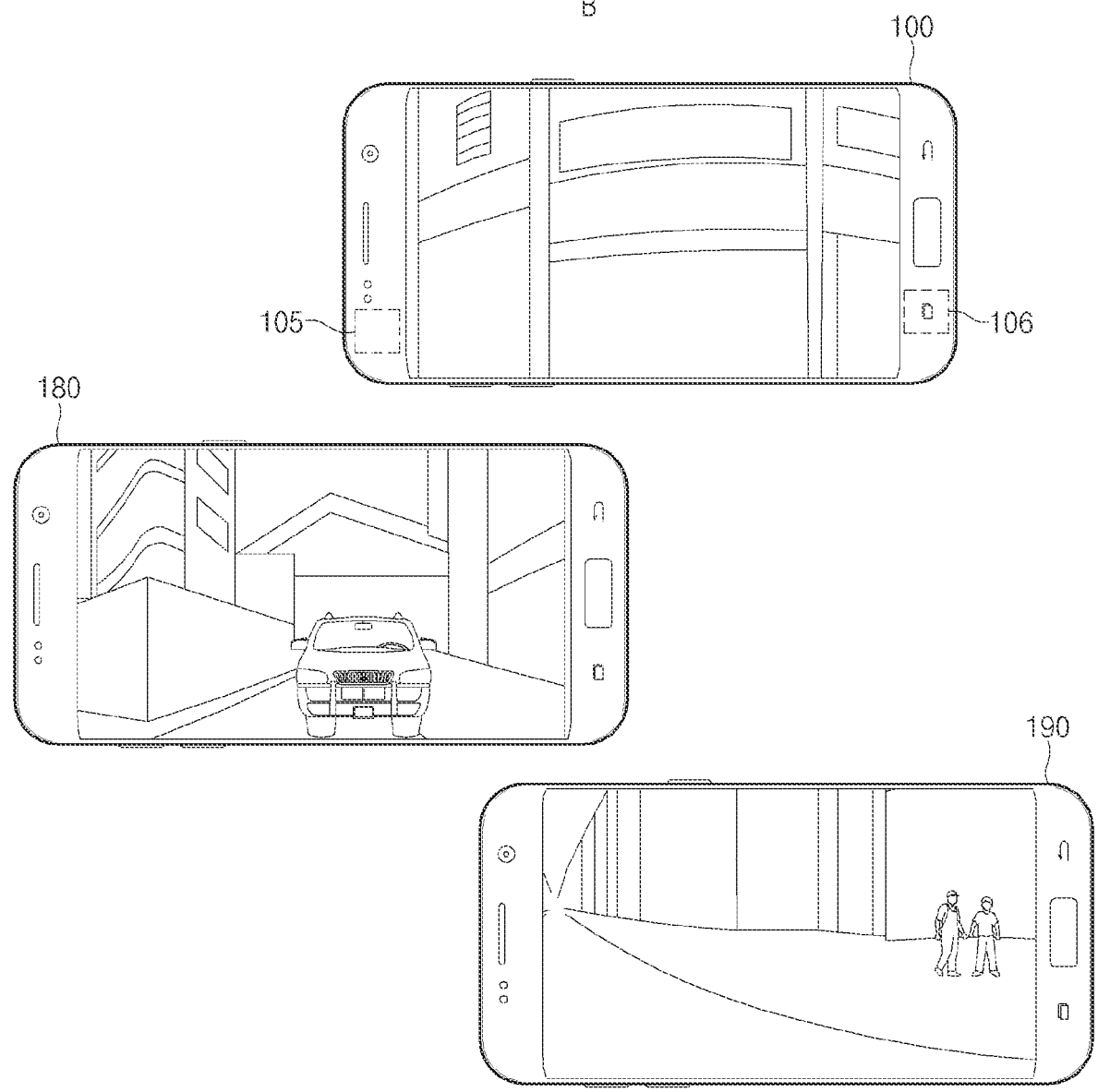

FIG. 1DA to 1DB illustrate views for describing a situation in which an electronic apparatus and an external electronic apparatuses adjust an output of a speaker based on a change of a display region, according to an embodiment.

FIG. 1DA may indicate the location of a region, which the electronic apparatus 100 and the external electronic apparatuses 180 and 190 display, in the 360-degree image 30.

Referring to FIG. 1DA and 1DB, each of the electronic apparatus 100 and the first external electronic apparatus 180, and the second external electronic apparatus 190 may display a partial region in the 360-degree image. For example, the electronic apparatus 100 may display region A; the first external electronic apparatus 180 may display region B; the second external electronic apparatus 190 may display region C.

According to an embodiment, the second external electronic apparatus 190 may be in a state where the second external electronic apparatus 190 changes a display region by moving or rotating as described in FIG. 1CA to 1CC. For example, similarly to FIG. 1CA, the second external electronic apparatus 190 may be in a state where the second external electronic apparatus 190 rotates clockwise with respect to the first axis 111 (e.g., the first axis 111 of FIG. 1CA).

According to another embodiment, as illustrated in FIG. 1CB, the second external electronic apparatus 190 may be in a state where the second external electronic apparatus 190 moves in a first direction 121 by 30 degrees with respect to the reference axis 120 at a location in FIG. 1BA. In this case, the coordinates of the second external electronic apparatus 190 may be changed from (3, 0) to (4, 0).

According to another embodiment, as illustrated in FIG. 1CB, the second external electronic apparatus 190 may be in a state where the second external electronic apparatus 190 displays the third region 133 (e.g., the third region 133 of FIG. 1CC) via the second region 132 (e.g., the second region 132 of FIG. 1CC) while displaying the first region 131 (e.g., the first region 131 of FIG. 1CC). In this case, it may be understood that the second external electronic apparatus 190 rotates or moves in the right direction with respect to the first region 131, which have been displayed by the second external electronic apparatus 190.

In addition, the second external electronic apparatus 190 may be in a state where the second external electronic apparatus 190 changes a display region based on a user input signal.

According to an embodiment, the second external electronic apparatus 190 may transmit the display region change state of the second external electronic apparatus 190 to the electronic apparatus 100 and the first external electronic apparatus 180.

The electronic apparatus 100 and the first external electronic apparatus 180 that receive information associated with the display region change of the second external electronic apparatus 190 may adjust the output of the voice data received after being generated by the second external electronic apparatus 190, based on the information.

For example, the electronic apparatus 100 may adjust the output of the voice data received after being generated by the second external electronic apparatus 190, to be lowered based on the movement of the second external electronic apparatus 190 as illustrated in FIG. 1DA to 1DB. That is, when the direction in which the second external electronic apparatus 190 faces is far from the direction in which the electronic apparatus 100 faces, the electronic apparatus 100 may adjust the output of the voice data received after being generated by the second external electronic apparatus 190, to be lowered.

According to another embodiment, when the electronic apparatus 100 includes a plurality of speakers (e.g., a first speaker and a second speaker), the electronic apparatus 100 may differentially adjust the outputs of the speakers in such a situation.

For example, it may be assumed that it is possible to adjust the output of a speaker from level 0 to level 10. The electronic apparatus 100 may be in a state where the electronic apparatus 100 outputs voice data received from the second external electronic apparatus 190 such that the first speaker becomes level 5 and the second speaker becomes level 7. The electronic apparatus 100 may adjust the output of the second speaker, which is positioned in the direction close to the rotational direction of the second external electronic apparatus 190, to level 6 and may adjust the output of the first speaker, which is positioned in the direction opposite to the rotational direction of the second external electronic apparatus 190, to level 3, based on the movement in which the second external electronic apparatus 190 rotates to the right.

According to an embodiment, the user of the electronic apparatus 100 may listen to the sound, using a stereo earphone (or a headphone, a Bluetooth earphone, or the like). The electronic apparatus 100 may differentially adjust the output of the earphone set to be worn on the user's right ear and the output of the earphone set to be worn on the user's left ear in the stereo earphone, based on the movement in which the second external electronic apparatus 190 rotates to the right.

As such, the electronic apparatus 100, the first external electronic apparatus 180, and/or the second external electronic apparatus 190 may adaptively adjust the output of a speaker depending on the direction facing the 360-degree image 30, thereby providing an effect similar to an effect that users watch the 360-degree image 30 in a virtual space together.

Figure 2:
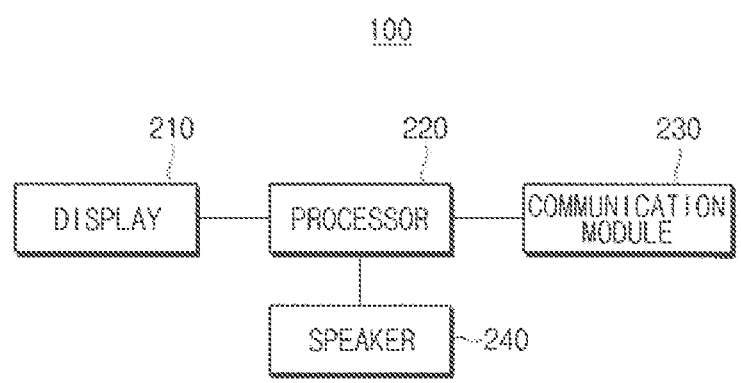
FIG. 2 is a schematic block diagram of an electronic apparatus, according to an embodiment.

FIG. 2 is a schematic block diagram of an electronic apparatus, according to an embodiment.

Referring to FIG. 2, the electronic apparatus 100 (e.g., the electronic apparatus 100 of FIG. 1CA) may include a display 210 (e.g., the display 101 of FIG. 1CA), at least one processor 220, a communication module 230, and a speaker 240. However, the electronic apparatus 100 may be implemented to include more or fewer components than the components disclosed in FIG. 2. For example, the electronic apparatus 100 may be configured to include a component such as a sensor module (e.g., a gesture sensor, a gyro sensor, or the like), a power supply, or the like. Also, a electronic apparatus 100 may include a memory that is able to store a command or data associated with at least one other element of the electronic apparatus 100.

The display 210 may include, for example, a liquid crystal display (LCD), a light-emitting diode (LED) display, an organic LED (OLED) display, a microelectromechanical systems (MEMS) display, transparent display, or an electronic paper display. The display 210 may include a touch screen and may receive, for example, a touch, gesture, proximity, or hovering input using an electronic pen or a part of a user's body.

According to an embodiment, the display 210 may display a 360-degree image based on the control of the processor 220.

The processor 220 may drive an operating system (OS) or an application program to control a plurality of hardware or software components connected to the processor 220 and may process and compute a variety of data.

According to an embodiment, the processor 220 may obtain information associated with a region displayed by an external electronic apparatus playing the same image as an image that is being currently played, using the communication module 230, may obtain the voice data generated by an external electronic apparatus, and may adjust the output of the speaker 240 to output the obtained voice data based on information about the obtained display region.

For example, the communication module 230 may include a cellular module, a Wi-Fi module, a Bluetooth module, an RF module, or the like. The communication module 230 may establish a network with an external another electronic apparatus, based on the control of the processor 220. The communication module 230 may be referred to as a communication circuit or a communication interface.

According to an embodiment, the communication module 230 may receive information associated with a region, which is being currently displayed, in the image played by the external electronic apparatus from an external electronic apparatus, based on the control of the processor 220. Furthermore, the communication module 230 may transmit information associated with a region, which is being currently displayed, in the image played by the electronic apparatus 100 to the external electronic apparatus based on the control of the processor 220.

The speaker 240 may be, for example, a device that outputs sound generated in the electronic apparatus 100. The speaker 240 may be included in, for example, an audio module (not illustrated). The electronic apparatus 100 may include at least one or more speakers 240. At least one speaker 240 may output sound based on the control of the processor 220.

Figure 3:
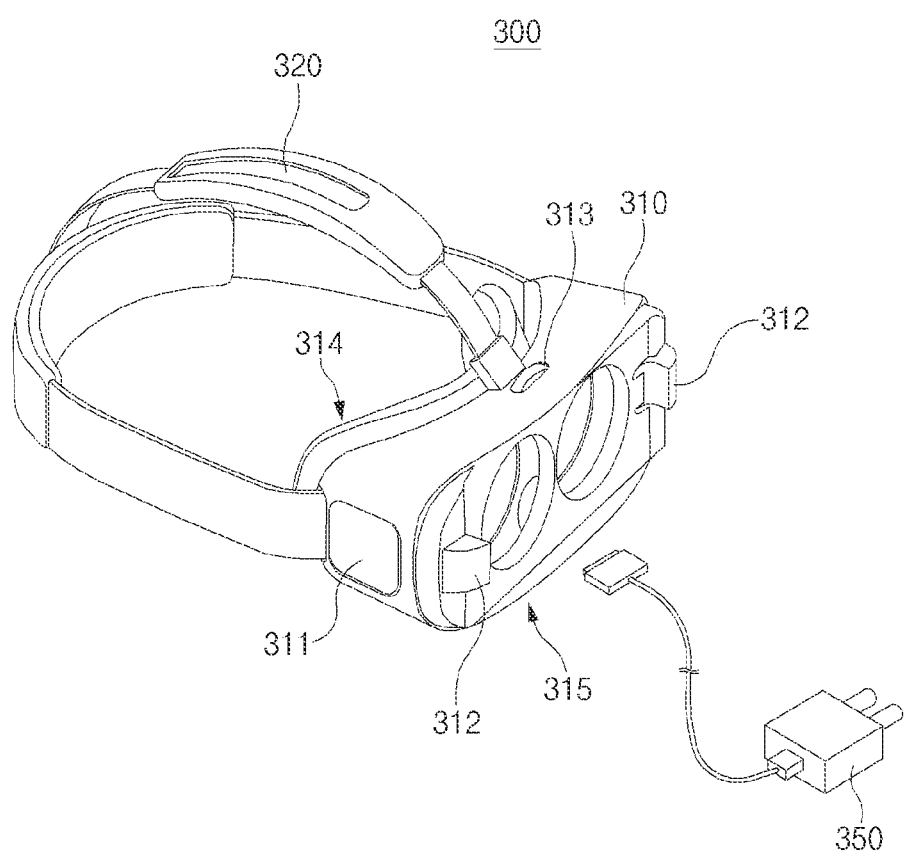
FIGS. 3 and 4 are views for describing the structure of a HMD device playing a 360-degree image, according to an embodiment.
Figure 4:
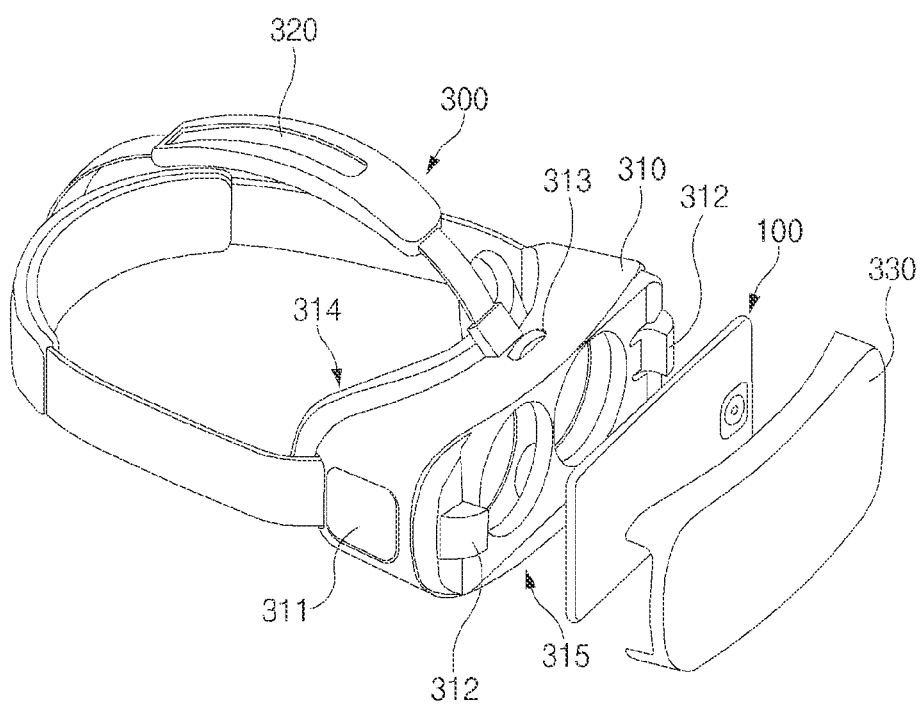

FIGS. 3 and 4 are views for describing the structure of a HMD device playing a 360-degree image, according to an embodiment.

Referring to FIGS. 3 and 4, an electronic apparatus such as the electronic apparatus 100 of FIG. 1CA, the first external electronic apparatus 180 of FIG. 1BB, and/or the second external electronic apparatus 190 of FIG. 1BB may be coupled to the HMD device to provide a user with an image.

Referring to FIG. 3, a HMD device 300 may include a main frame 310 configured to be removable from an electronic apparatus such as the electronic apparatus 100 of FIG. 1CA, the first external electronic apparatus 180 of FIG. 1BB, and/or the second external electronic apparatus 190 of FIG. 1BB and a mounting part 320 connected to the main frame 310 and configured to fix the main frame 310 to a part of a user's body. The HMD device 300 may also include the case where the main frame 310 and the electronic apparatus 100 are coupled to each other.

The main frame 310 may include a user input module 311 capable of controlling an electronic apparatus, a first interface unit 312 connected to the electronic apparatus, a display location adjusting part 313, a proximity sensor 314, and a second interface unit 315 connected to an external power supply device 350 or another external input device.

According to embodiments, the user input module 311 may include at least one of a physical key, a physical button, a touch key, a joystick, a wheel key, a touch pad, or the like. When the user input module 311 is a touch pad, the touch pad may be disposed on the side surface of the main frame 310. The touch pad may include a control object (e.g., a Graphical User Interface (GUI) for controlling sound or the image) indicating the function of the electronic apparatus or the HMD device 300.

The first interface unit 312 may support the HMD device 300 to communicate with the electronic apparatus. The first interface unit 312 may be accessed to an interface unit (e.g., USB port) of the electronic apparatus and may transmit a user input signal generated by the user input module 311, to the electronic apparatus. For example, the first interface unit 312 may transmit the user input signal (e.g., a touch input) received from the user input module 311, to the electronic apparatus. The electronic apparatus may perform a function corresponding to the user input signal. For example, the electronic apparatus may adjust a volume or may play an image, in response to the touch input.

The proximity sensor 314 may sense the proximity or location of the object, by sensing the proximity of the object in the non-contact manner. For example, when an object (e.g., a part of the user's body) is sensed within the specified sensing distance, the proximity sensor 314 may transmit the sensed signal to the main controller of the HMD device 300. When any object is not sensed within the specified sensing distance, the proximity sensor 314 may not transmit any signal to the main controller. The main controller may determine that a user wears the HMD device 300, based on the signal sensed by the proximity sensor 314. For example, for the purpose of easily sensing whether the HMD device 300 is worn, the proximity sensor 314 may be disposed at the inner upper portion of the main frame 310 to approach the user's forehead when the user is wearing the HMD device 300.

In the disclosure, the proximity sensor is disclosed, but another sensor may be used to detect whether the HMD device 300 is worn according to an embodiment. For example, at least one or more of an acceleration sensor, a gyro sensor, a geomagnetic sensor, a gesture sensor, and a biometric sensor, a touch sensor, an illuminance sensor, or a grip sensor may be mounted in the main frame 310.

The second interface unit 315 may be connected to the external power supply device 350 or another external input device. For example, when the second interface unit 315 is connected to the external power supply device 350, the HMD device 300 may receive power from the external power supply device 350. The received power may be used for the operating power of the HMD device 300, may be transmitted to the electronic apparatus to be used for the operating power of the electronic apparatus, or may be used to charge the electronic apparatus. Alternatively, when the second interface unit 315 is connected to an external input device, the HMD device 300 may receive an external input signal from the external input device and may transmit the external input signal to the main controller of the HMD device 300.

The main frame 310 may be configured to be removable from an external device such as the electronic apparatus. For example, the main frame 310 may include a space, a structure, or a cavity capable of accommodating the electronic apparatus. A portion forming the space of the main frame 310 may include the elastic material. The portion forming the space of the main frame 310 may be implemented with a flexible material such that the size or volume of the space is capable of being changed depending on devices of various sizes to be accommodated in the space.

The rear surface (inner surface) of the main frame 310 may further include a face contact part that is in contact with the user's face. A lens assembly that includes at least one lens may be inserted into a part of the face contact part positioned at a location which the user's eyes face, in the rear surface (inner surface) of the main frame 310. A display or a transparent/translucent lens may be integrated with the face contact part in the lens assembly. The lens assembly may be implemented to be removable from the face contact part. A part of the face contact part may include a nose recess having a shape into which the user's nose is inserted.

In an embodiment, the main frame 310 may include a material which allows the user to feel comfortable wearing sensation and is capable of supporting the electronic apparatus, for example, a plastic material. In another embodiment, the main frame 310 may include at least one material of glass, ceramic, metal (e.g., aluminum) or metal alloy (e.g., steel, stainless steel, titanium, or magnesium alloy) for the strength and beauty.

The mounting part 320 may be mounted on a portion of a body of a user. The mounting part 320 may include a band of an elastic material. According to embodiments, the mounting part 320 may include eyeglass temples, helmets, straps, or the like.

FIG. 4 is a view illustrating a coupling of a HMD device and an electronic apparatus, according to various embodiments.

Referring to FIG. 4, the HMD device 300 may further include a cover 330 for fixing the electronic apparatus 100 coupled to the main frame 310. The cover 330 may be physically coupled to the main frame 310 in the form of a hook, or may be coupled in the manner such as a magnet or an electromagnet. The cover 330 may prevent the electronic apparatus 100 from deviating from the main frame 310 by the movement of the user and may protect the electronic apparatus 100 from external impact.

The main frame 310 and the display 101 (e.g., the display 101 of FIG. 1CA) of the electronic apparatus 100 may be coupled to face to each other. After coupling the electronic apparatus 100 to the first interface unit 312 of the main frame 310, the user may couple the HMD device 300 to the electronic apparatus 100 by inserting the cover 330.

Figure 5:
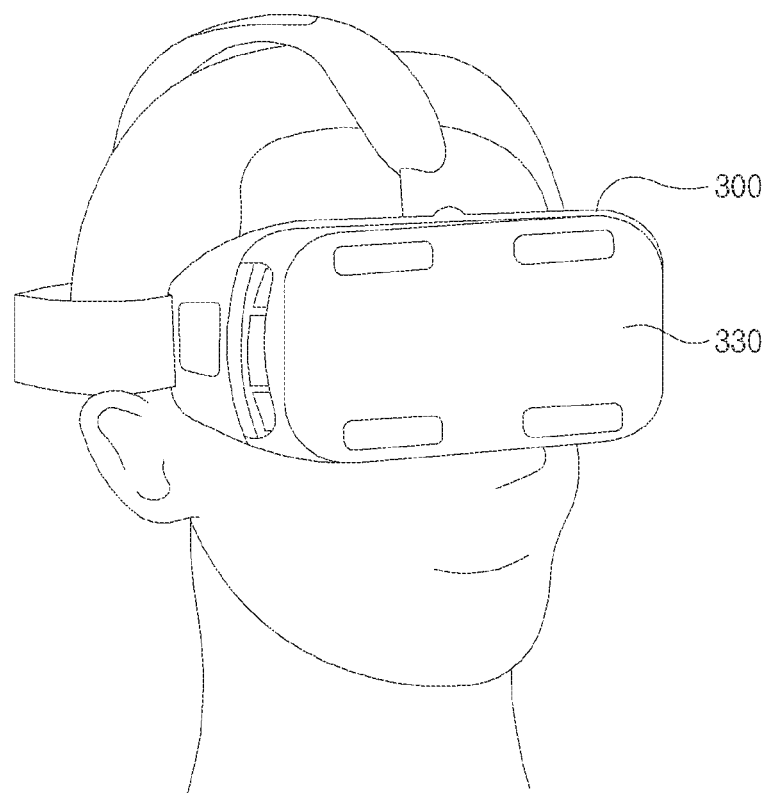
FIG. 5 is a view illustrating a state where a user wears a HMD device, according to various embodiments.

FIG. 5 is a view illustrating a state where a user wears a HMD device, according to various embodiments.

Referring to FIG. 5, when a user wears the HMD device 300 that is coupled to an electronic apparatus such as the electronic apparatus 100 of FIG. 1CA, the first external electronic apparatus 180 of FIG. 1BB, and/or the second external electronic apparatus 190 of FIG. 1BB and is covered with the cover 330, the user may watch the screen of the electronic apparatus via the HMD device 300. In this case, the electronic apparatus may output a left-eye image and a right-eye image on a display, and the HMD device 300 may process images of the electronic apparatus via lens assembly implemented in a face contact part of the main frame 310 and may allow the user to watch the processed image, for example, Augmented Reality (AR) through a see-through function or Virtual Reality (VR) through a see-closed function.

The HMD device may include an untethered VR method that uses the display of an external electronic apparatus as it is and a tethered VR method in which the HMD device itself has a display. A method of driving of the above-described electronic apparatus and the HMD device 300 may be a driving method based on the untethered VR method The HMD device 300 according to an embodiment of the disclosure may include the tethered VR method. The HMD device 300 according to the tethered VR method may include a display capable of playing content. Accordingly, the HMD device 300 according to the tethered VR method may play the content even though the HMD device 300 is not mechanically coupled to the above-described electronic apparatus 100. In particular, the HMD device 300 according to the tethered VR method may receive high-definition image data generated by the electronic apparatus 100, via a connector and may output (e.g., mirroring) the image to the display owned by the HMD device 300.

The HMD device 300 according to the tethered VR method and the electronic apparatus may be connected to each other via various image communication interfaces. For example, the image data may comply with the specification of image communication interface such as a HDMI interface, a mobile high-definition link (MHL) interface, a DisplayPort interface, a USB audio video device interface, or the like and may comply with the specification created by each manufacturer.

The image data may be transmitted to the connector. For example, data terminals such as Rx, Tx, or the like of a connector of USB type-C may be used for image data transmission. In the disclosure, the types of wired communication interfaces and connectors used by the HMD device 300 and electronic apparatus are not limited to a single type.

Figure 6A:
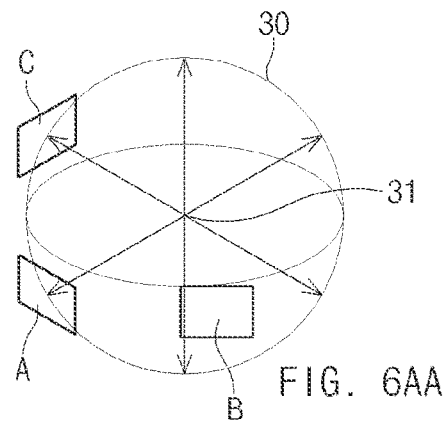
FIGS. 6AA to 6BB illustrate views for describing a situation in which an electronic apparatus and an external electronic apparatuses adjust an output of a speaker based on a zoom operation, according to an embodiment.
Figure 6A:
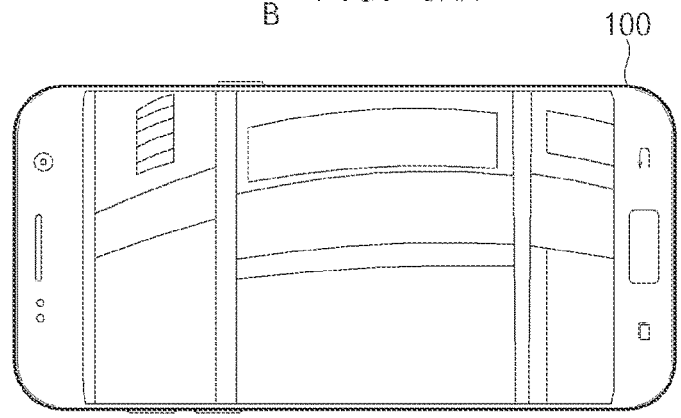
Figure 6A:
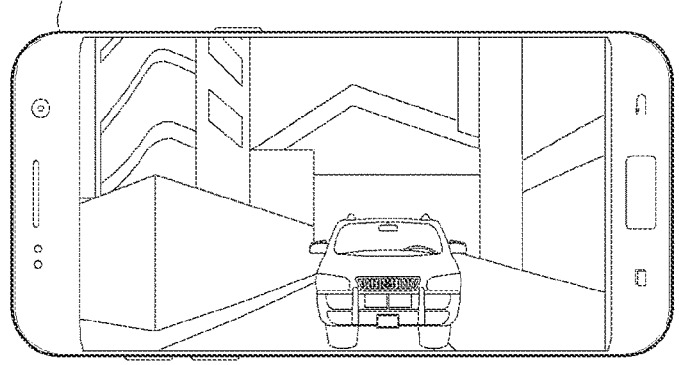
Figure 6A:
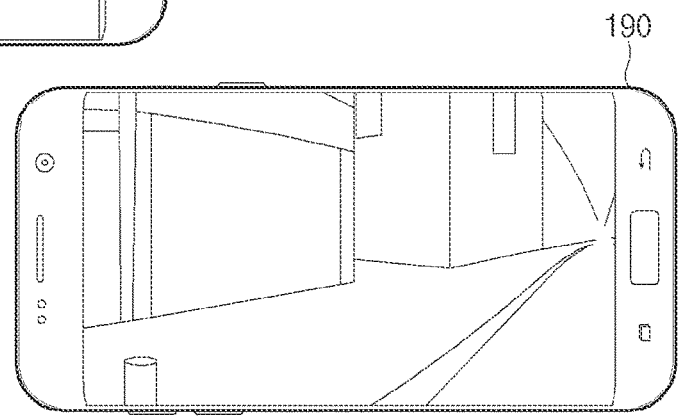

FIGS. 6AA to 6BB illustrate views for describing a situation in which an electronic apparatus and an external electronic apparatuses adjust an output of a speaker based on a zoom operation, according to an embodiment.

FIG. 6AA may indicate the location of a region, which an electronic apparatus and external electronic apparatuses display, in the 360-degree image 30.

Referring to FIG. 6AA and FIG. 6AB, the electronic apparatus 100 and the first external electronic apparatus 180, and the second external electronic apparatus 190 may display a partial region in the 360-degree image 30. For example, the electronic apparatus 100 may display region A; the first external electronic apparatus 180 may display region B; the second external electronic apparatus 190 may display region C. For example, a user of the electronic apparatus 100, a user of the first external electronic apparatus 180, and the user of the second external electronic apparatus 190 may experience an effect similar to an effect that the users watch display regions at a center point 31 of the 360-degree image 30, respectively.

The electronic apparatus 100 according to an embodiment, the first external electronic apparatus 180, and the second external electronic apparatus 190 may perform a zoom operation for enlarging or reducing the display region based on a user input. For example, it may be understood that the enlarging of the display region means that the user watches the image behind the currently displayed image; it may be understood that the reducing of the display region means that the user watches the image in front of the currently displayed image FIG. 6BA and 6BB illustrate a situation in which the second external electronic apparatus 190 enlarges and displays region C.

Figure 6B:
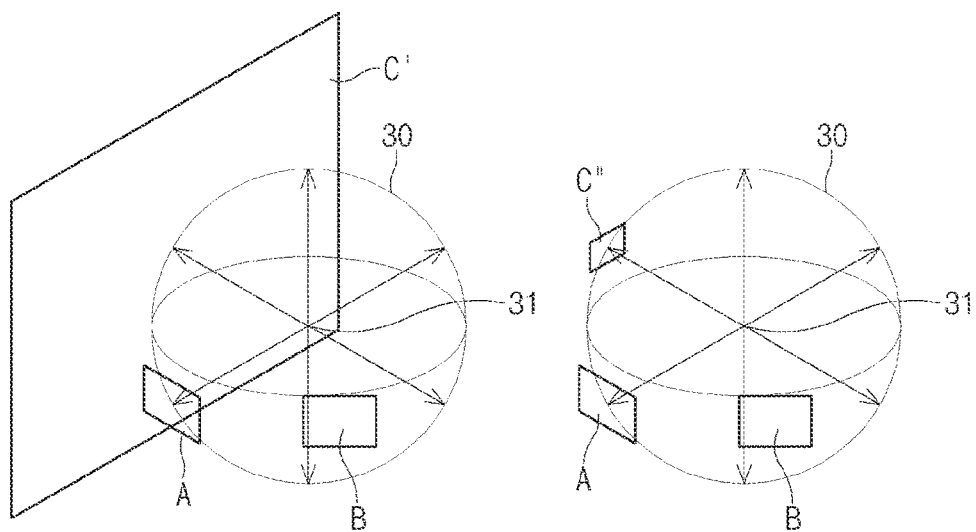
Figure 6B:
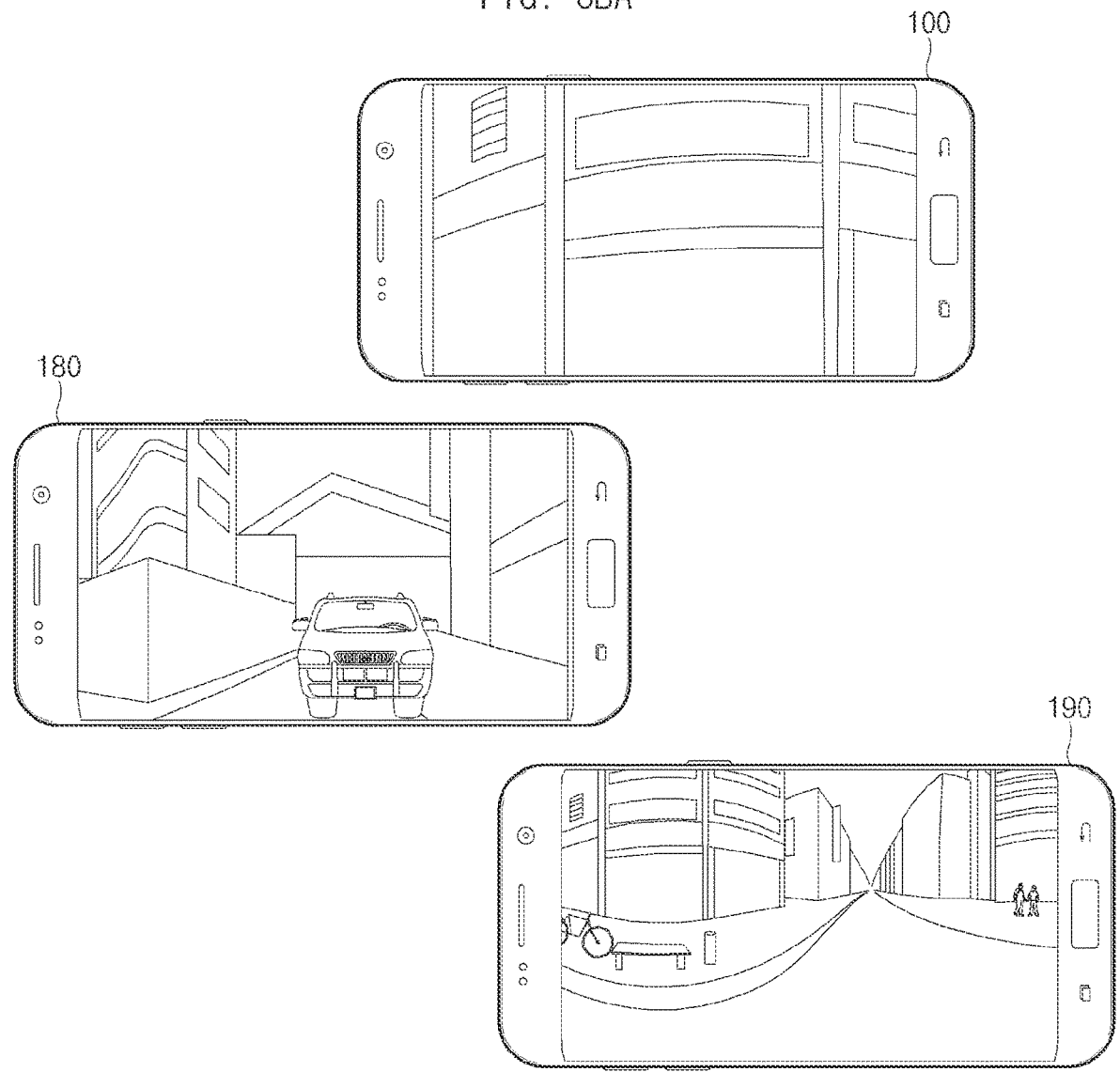

Referring to FIG. 6BA and 6BB, the second external electronic apparatus 190 may enlarge region C to display the enlarged region C as region C', based on a display region enlarging signal input of the user manipulating the second external electronic apparatus. When a user's voice is entered in a state where the second external electronic apparatus 190 displays region C', the second external electronic apparatus 190 may transmit the entered voice to the electronic apparatus 100 and the first external electronic apparatus 180.

In this case, the electronic apparatus 100 and the first external electronic apparatus 180 may set that the user of the second external electronic apparatus 190 moves in the opposite direction of the display region from the center point 31 to widen the angle of view and may adjust the output of a speaker that plays the voice received after being generated by the second external electronic apparatus 190, to be high.

In contrast, the second external electronic apparatus 190 may reduce region C to display the reduced region C as region C", based on a display region reducing signal input of the user. When the user's voice is entered in a state where the second external electronic apparatus 190 displays region C", the second external electronic apparatus 190 may transmit the entered voice to the electronic apparatus 100 and the first external electronic apparatus 180.

In this case, the electronic apparatus 100 and the first external electronic apparatus 180 may set that the user of the second external electronic apparatus 190 moves in the direction of the display region from the center point 31 to narrow the angle of view and may adjust the output of a speaker that plays the voice received after being generated by the second external electronic apparatus 190, to be low.

Figure 7A:
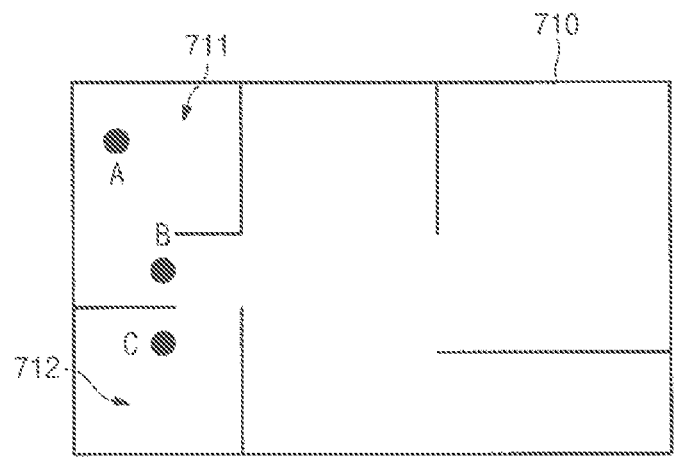
FIGS. 7AA to 7CB are views for describing a situation of adjusting an output of a speaker based on a case where a location in an image is changed when an electronic apparatus and an external electronic apparatus play the same image, according to an embodiment.
Figure 7A:
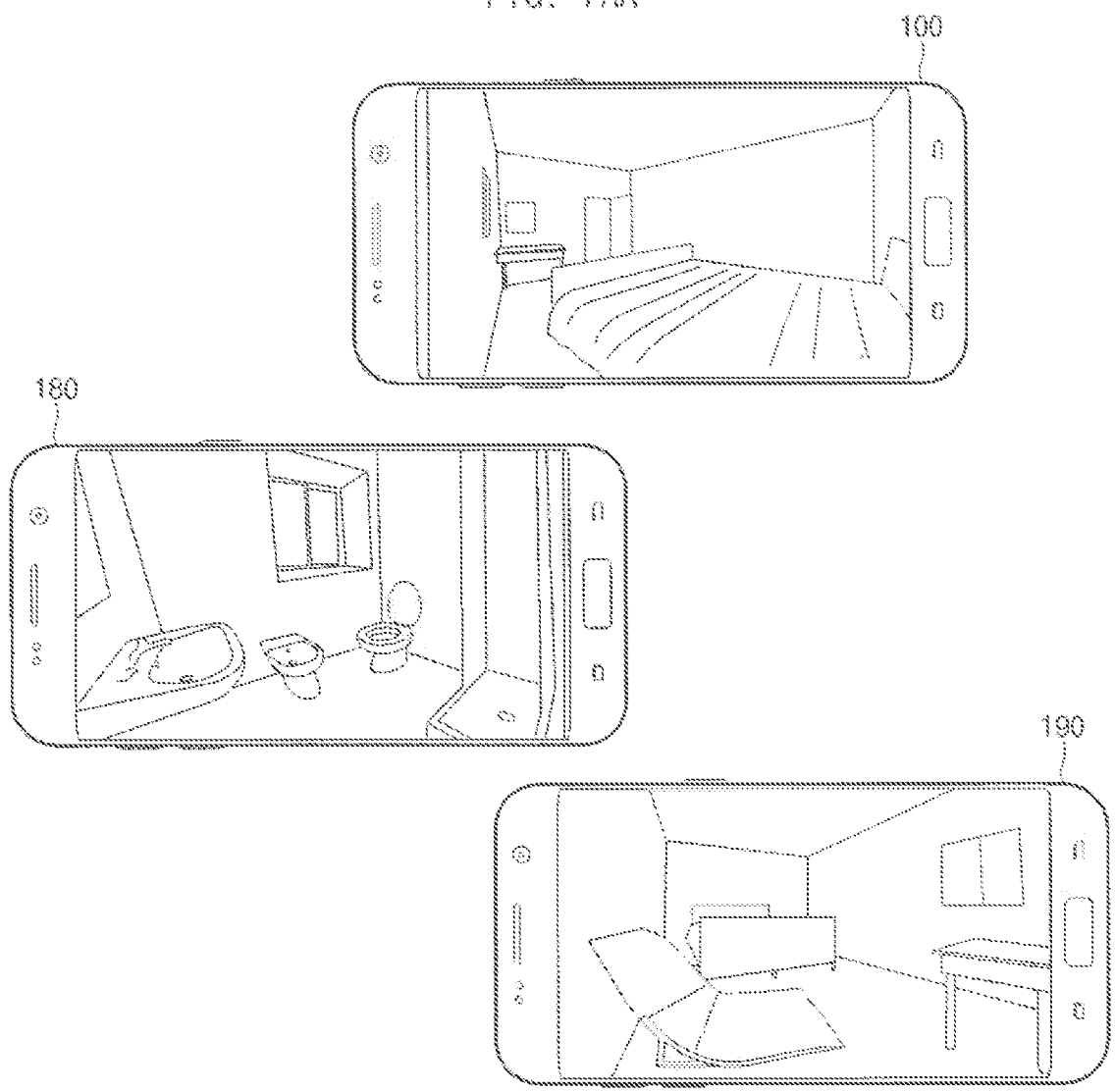

FIGS. 7AA to 7BB are views for describing a situation of adjusting an output of a speaker based on a case where a displayed region is changed when an electronic apparatus and an external electronic apparatus play the same image, according to an embodiment.

The electronic apparatus according to an embodiment and an external electronic apparatus may play a 360-degree image captured while the location of the 360-degree image is moved or 360-degree content (e.g., animations, games, or the like), the location of which is capable of being moved, substantially at the same time.

For example, FIG. 7AA is a plan view schematically illustrating a house 710 including a plurality of spaces. The 360-degree image (e.g., the 360-degree image 30 of FIG. 1BA) may be an image captured while moving in the plurality of spaces included in the house 710. Alternatively, the 360-degree image 30 may be an image captured in real time.

The 360-degree image may be transmitted to the electronic apparatus 100, the first external electronic apparatus 180, and the second external electronic apparatus 190 via a server (not illustrated). According to another embodiment, the electronic apparatus 100 may transmit the 360-degree image 30 to the first external electronic apparatus 180 and the second external electronic apparatus 190.

Referring to FIG. 7AA and FIG. 7AB, the electronic apparatus 100, the first external electronic apparatus 180, and the second external electronic apparatus 190 may display a partial region in the 360-degree image. For example, the electronic apparatus 100 may display a region, which is viewed at point A included in a first space 711; the first external electronic apparatus 180 may display a region, which is viewed at point C included in a second space 712; the second external electronic apparatus 190 may display a region, which is viewed at point B included in the first space 711.

In a state where users of the electronic apparatus 100, the first external electronic apparatus 180, and the second external electronic apparatus 190 are geographically spaced from one another, the users may experience a situation the same as a situation where the users watch the house 710 in the real site, using the 360-degree image 30 displayed on each of the electronic apparatuses.

According to an embodiment, the 360-degree image may include information about the captured region. Accordingly, the electronic apparatus 100, the first external electronic apparatus 180, and the second external electronic apparatus 190 may obtain relative locations between each other, based on the currently displayed region. Furthermore, the electronic apparatus 100, the first external electronic apparatus 180, and the second external electronic apparatus 190 may obtain the movement and the direction in which each electronic apparatus faces, using the above-described methods.

According to an embodiment, the electronic apparatus 100, the first external electronic apparatus 180, and the second external electronic apparatus 190 may adjust the output of voice received after being generated by each electronic apparatus, based on the above-described relative distance and the direction in which each electronic apparatus faces.

Figure 7B:
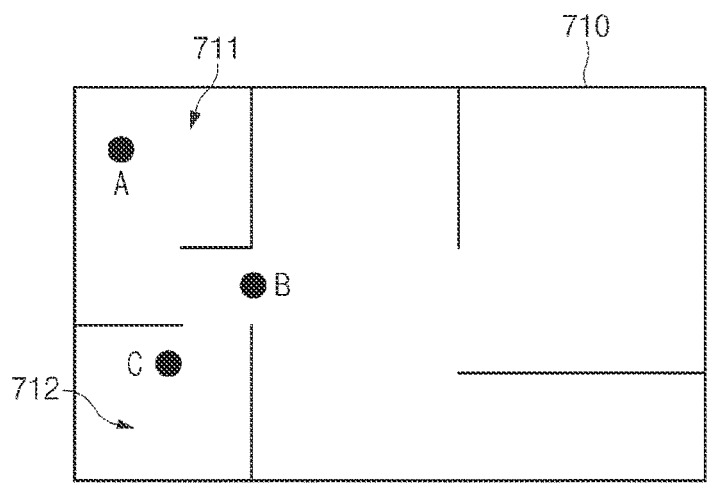
Figure 7B:
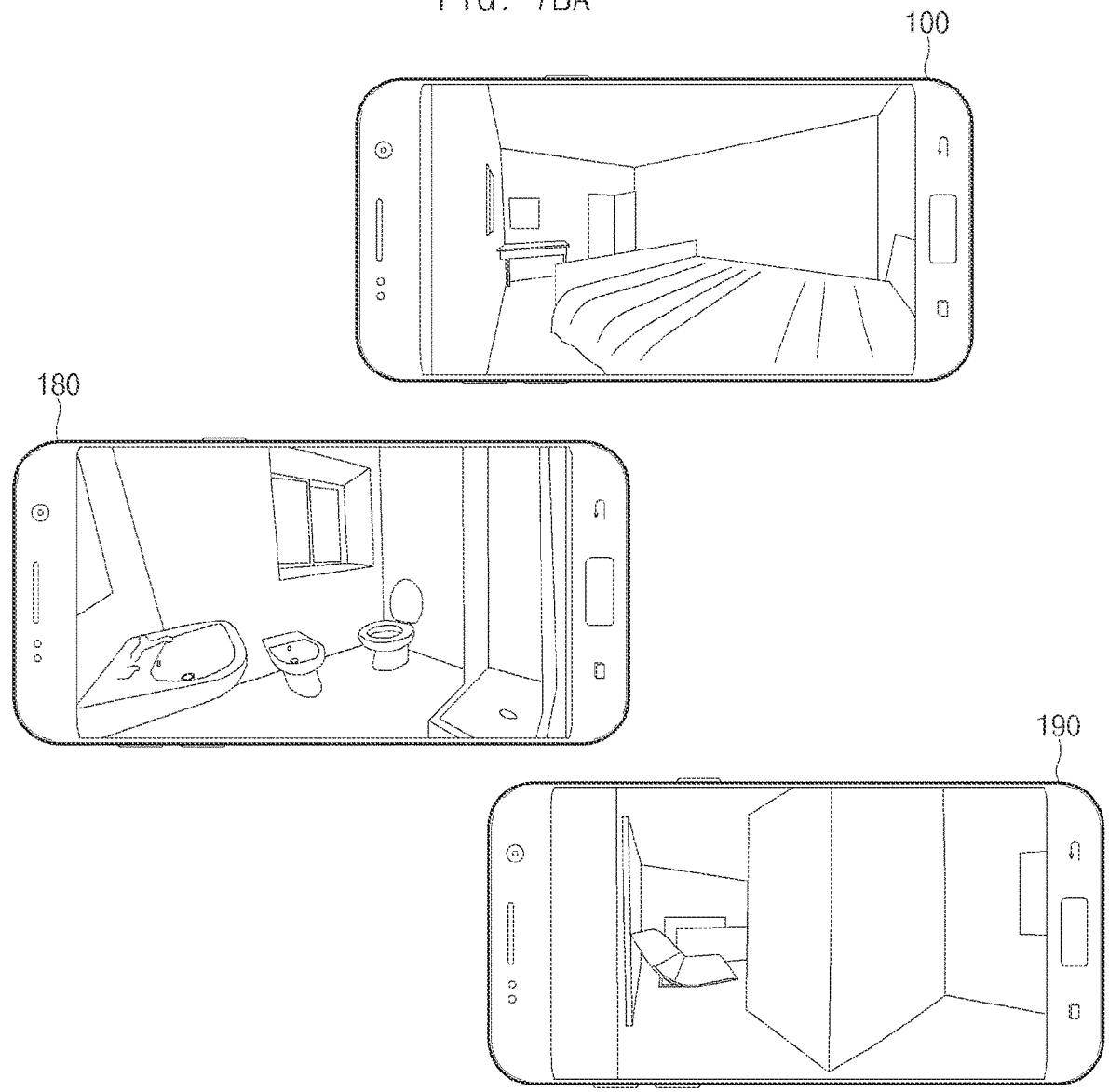

Referring to FIG. 7BA, the second external electronic apparatus 190 may change the region displayed in the 360-degree image (e.g., the 360-degree image 30 of FIG. 1BA), based on a user input.

Referring to FIG. 7BA and FIG. 7BB, the second external electronic apparatus 190 may display a new region in the 360-degree image. For this reason, the electronic apparatus 100 and the first external electronic apparatus 180 may obtain information indicating that the second external electronic apparatus 190 displays another space that is far from the space displayed by the electronic apparatus 100 and the first external electronic apparatus 180.

In this case, when playing the voice generated by the second external electronic apparatus 190, the electronic apparatus 100 and the first external electronic apparatus 180 may adjust the output of a speaker (not illustrated) to be low, based on the fact that the distance increases.

For example, it may be assumed that the output of the speaker included in each of the electronic apparatuses may be adjusted from level 0 to level 10. When the electronic apparatus 100 and the first external electronic apparatus 180 have played the voice, which is received from the second external electronic apparatus 190, with the output of level 7, while the second external electronic apparatus 190 is positioned in the first region 711, the electronic apparatus 100 and the first external electronic apparatus 180 may adjust and play the voice received from the second external electronic apparatus 190, to the output of level 6 based on the display region change of the second external electronic apparatus 190.

Figure 7C:
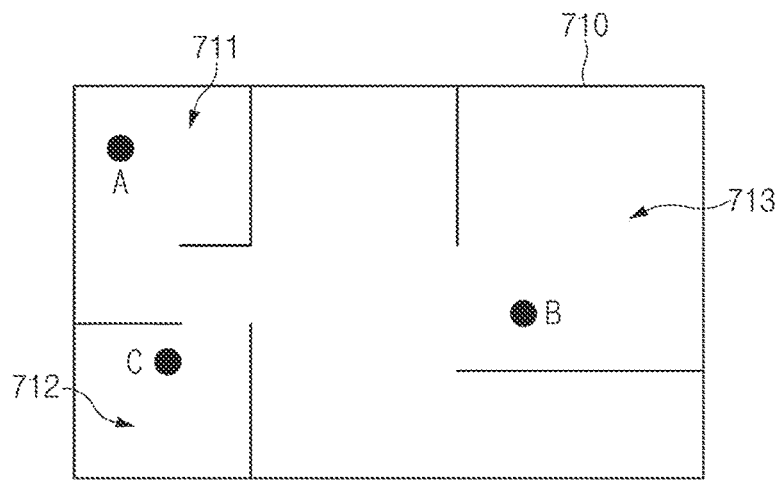
Figure 7C:
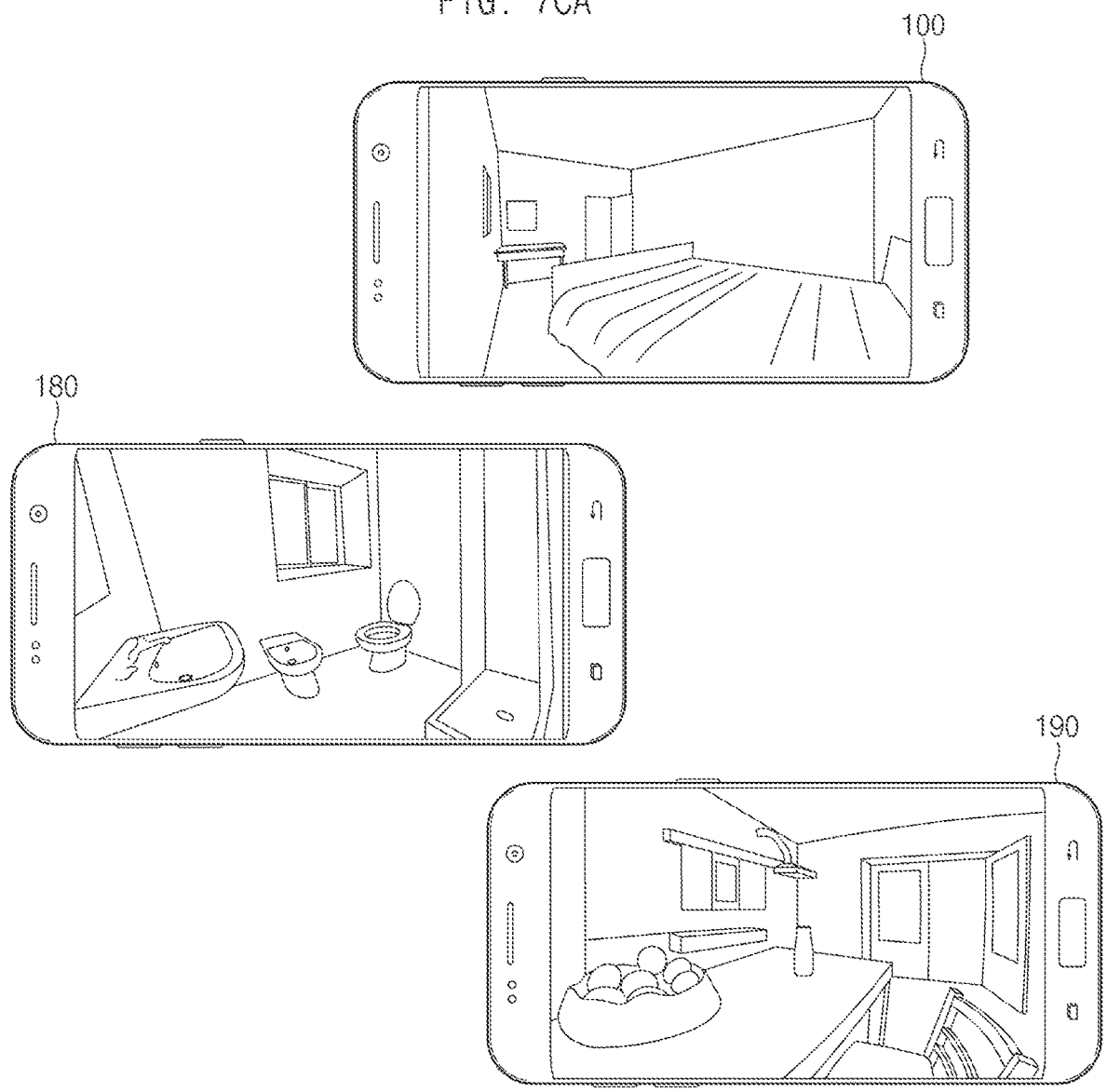

Referring to FIG. 7CA and FIG. 7CB, the second external electronic apparatus 190 may display a new region in the 360-degree image. For this reason, the electronic apparatus 100 and the first external electronic apparatus 180 may obtain information indicating that the second external electronic apparatus 190 display a third space 713 that is farther from the space displayed by the electronic apparatus 100 and the first external electronic apparatus 180.

In this case, when playing the voice generated by the second external electronic apparatus 190, the electronic apparatus 100 and the first external electronic apparatus 180 may adjust the output of a speaker (not illustrated) to be lower, based on the fact that the distance increases.

For example, when the electronic apparatus 100 and the first external electronic apparatus 180 have played the voice, which is received from the second external electronic apparatus 190, with the output of level 6, while the second external electronic apparatus 190 is adjacent to the first region 711, the electronic apparatus 100 and the first external electronic apparatus 180 may play the voice received from the second external electronic apparatus 190, with the output of level 2 based on the display region change of the second external electronic apparatus 190.

As such, the electronic apparatus 100, the first external electronic apparatus 180, and the second external electronic apparatus 190 may change a region displayed in the 360-degree image (e.g., the 360-degree image 30 of FIG. 1BA), based on a user input and may adjust the output of the voice received by each electronic apparatus, based on the change of the display region. For this reason, even though users watch the 360-degree image at locations physically spaced from one another, the users may obtain an effect similar to an effect the users watch an image in a space at the same time.

Figure 8:
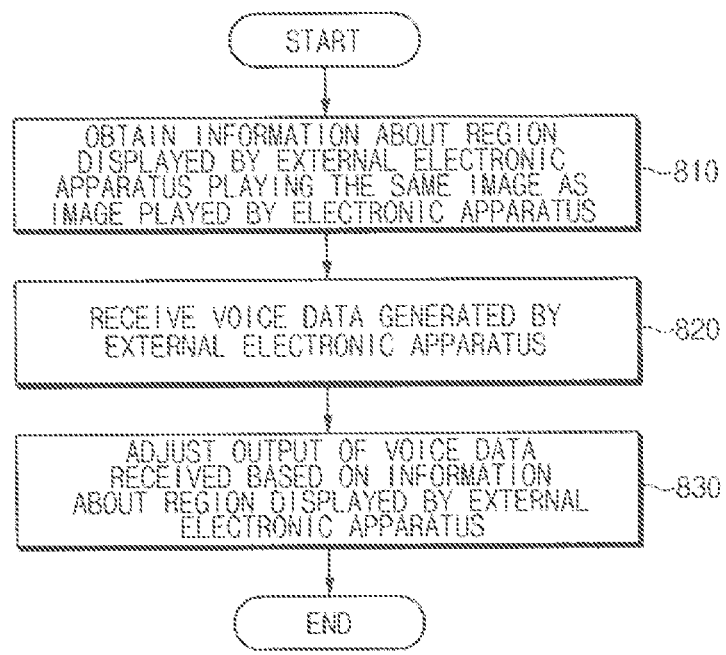
FIG. 8 is a flowchart for describing a situation in which an electronic apparatus adjusts an output of a speaker based on a region displayed by an external electronic apparatus playing the same image, according to an embodiment.

FIG. 8 is a flowchart for describing a situation in which an electronic apparatus adjusts an output of a speaker based on a region displayed by an external electronic apparatus playing the same image, according to an embodiment.

Referring to operation 810, the electronic apparatus 100 (e.g., the electronic apparatus 100 of FIG. 1CA) may obtain information about a region displayed by an external electronic apparatus playing the same image as the image played by the electronic apparatus 100.

According to an embodiment, the electronic apparatus 100 may play a 360-degree image. At this time, the electronic apparatus 100 may display a partial region in the 360-degree image. However, an embodiment is not limited thereto. The electronic apparatus 100 may display the whole region.

The electronic apparatus 100 and an external electronic apparatus may change a display region in the 360-degree image, based on the movement of the electronic apparatus 100 and the external electronic apparatus. Accordingly, the electronic apparatus 100 and the external electronic apparatus may obtain the movement of the electronic apparatus 100 and the external electronic apparatus, based on the displayed region. Also, even though the electronic apparatus 100 and the external electronic apparatus change a region displayed based on a user's touch signal input or physical key input, the electronic apparatus 100 and external electronic apparatus may match that the movement occurs based on the changed display region.

That is, when users of the electronic apparatus 100 and the external electronic apparatus change the displayed region, the users of the electronic apparatus 100 and the external electronic apparatus may obtain the effect the same as the effect that the watched viewpoint is changed while the users watch the 360-degree image 30 together at the center point of the 360-degree image.

Referring to operation 820, the electronic apparatus 100 may receive voice data generated by the external electronic apparatus. The electronic apparatus 100 may output the received voice via a speaker or the like.

Referring to operation 830, the electronic apparatus 100 may adjust the output of voice data received based on information about a region displayed by the external electronic apparatus. For example, when the region displayed by the external electronic apparatus is changed, the electronic apparatus 100 may obtain the distance difference between a region displayed by the external electronic apparatus and a region displayed by the electronic apparatus 100. Furthermore, the electronic apparatus 100 may obtain information about the direction in which the external electronic apparatus faces, based on the change of a region displayed by the external electronic apparatus.

The electronic apparatus 100 may adjust the output of voice data received from the external electronic apparatus, based on the difference in the display region from the external electronic apparatus and the direction in which the external electronic apparatus faces.

For example, when it is determined that the external electronic apparatus is relatively far, the electronic apparatus 100 may adjust the output of voice data to be low; when it is determined that the external electronic apparatus is relatively close, the electronic apparatus 100 may adjust the output of voice data to be high.

Figure 9:
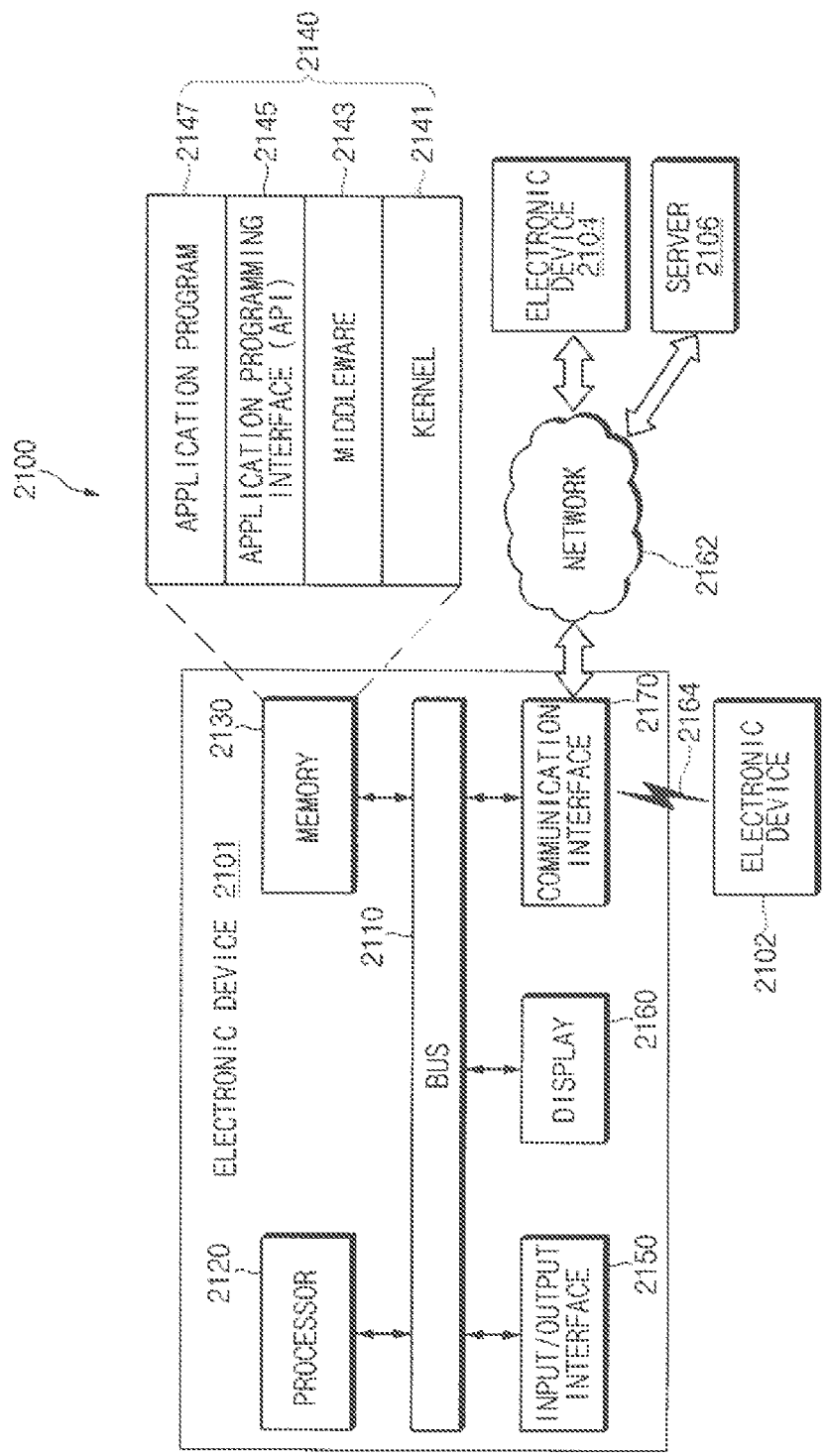
FIG. 9 is a view illustrating an electronic apparatus in a network environment according to various embodiments.

Referring to FIG. 9, in various embodiments, an electronic apparatus 2101 in a network environment 2100 may be described. The electronic apparatus 2101 may include a bus 2110, a processor 2120, a memory 2130, an input/output interface 2150, a display 2160, and a communication interface 2170. The electronic apparatus 2101 may include the electronic apparatus 100 of FIG. 1. According to an embodiment, the electronic apparatus 2101 may not include at least one of the above-described components or may further include other component(s). The bus 2110 may interconnect the above-described components 2110 to 2170 and may include a circuit for conveying communications (e.g., a control message and/or data) among the above-described components. The processor 2120 may include one or more of a central processing unit (CPU), an application processor (AP), or a communication processor (CP). For example, the processor 2120 may perform an arithmetic operation or data processing associated with control and/or communication of at least other components of the electronic apparatus 2101.

The memory 2130 may include a volatile and/or nonvolatile memory. For example, the memory 2130 may store instructions or data associated with at least one other component(s) of the electronic apparatus 2101. According to an embodiment, the memory 2130 may store software and/or a program 2140. The program 2140 may include, for example, a kernel 2141, a middleware 2143, an application programming interface (API) 2145, and/or an application program (or "an application") 2147. At least a part of the kernel 2141, the middleware 2143, or the API 2145 may be referred to as an "operating system (OS)". For example, the kernel 2141 may control or manage system resources (e.g., the bus 2110, the processor 2120, the memory 2130, and the like) that are used to execute operations or functions of other programs (e.g., the middleware 2143, the API 2145, and the application program 2147). Furthermore, the kernel 2141 may provide an interface that allows the middleware 2143, the API 2145, or the application program 2147 to access discrete components of the electronic apparatus 2101 so as to control or manage system resources.

The middleware 2143 may perform, for example, a mediation role such that the API 2145 or the application program 2147 communicates with the kernel 2141 to exchange data. Furthermore, the middleware 2143 may process one or more task requests received from the application program 2147 according to a priority. For example, the middleware 2143 may assign the priority, which makes it possible to use a system resource (e.g., the bus 2110, the processor 2120, the memory 2130, or the like) of the electronic apparatus 2101, to at least one of the application program 2147 and may process the one or more task requests. The API 2145 may be an interface through which the application program 2147 controls a function provided by the kernel 2141 or the middleware 2143, and may include, for example, at least one interface or function (e.g., an instruction) for a file control, a window control, image processing, a character control, or the like. The input/output interface 2150 may transmit an instruction or data input from a user or another external device, to other component(s) of the electronic apparatus 2101 or may output an instruction or data, received from other component(s) of the electronic apparatus 2101, to a user or another external device.

The display 2160 may include, for example, a liquid crystal display (LCD), a light-emitting diode (LED) display, an organic LED (OLED) display, a microelectromechanical systems (MEMS) display, or an electronic paper display. The display 2160 may display, for example, various contents (e.g., a text, an image, a video, an icon, a symbol, and the like) to a user. The display 2160 may include a touch screen and may receive, for example, a touch, gesture, proximity, or hovering input using an electronic pen or a part of a user's body. For example, the communication interface 2170 may establish communication between the electronic apparatus 2101 and an external device (e.g., the first external electronic apparatus 2102, the second external electronic apparatus 2104, or the server 2106). For example, the communication interface 2170 may be connected to the network 2162 over wireless communication or wired communication to communicate with the external device (e.g., the second electronic apparatus 2104 or the server 2106). The first external electronic apparatus 2102 may correspond to the first external electronic apparatus 180 of FIG. 1. The second external electronic apparatus 2104 may correspond to the second external electronic apparatus 190 of FIG. 1

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), ZigBee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 2162 may include at least one of telecommunications networks, for example, a computer network (e.g., LAN or WAN), an Internet, or a telephone network.

Each of the first and second external electronic apparatuses 2102 and 2104 may be a device of which the type is different from or the same as that of the electronic apparatus 2101. According to various embodiments, all or a portion of operations that the electronic apparatus 2101 will perform may be executed by another or plural electronic apparatuses (e.g., the electronic apparatus 2102 or 2104 or the server 2106). According to an embodiment, in the case where the electronic apparatus 2101 executes any function or service automatically or in response to a request, the electronic apparatus 2101 may not perform the function or the service internally, but, alternatively additionally, it may request at least a portion of a function associated with the electronic apparatus 2101 at other electronic apparatus (e.g., the electronic apparatus 2102 or 2104 or the server 2106). The other electronic apparatus (e.g., the electronic apparatus 2102 or 2104 or the server 2106) may execute the requested function or additional function and may transmit the execution result to the electronic apparatus 2101. The electronic apparatus 2101 may provide the requested function or service using the received result or may additionally process the received result to provide the requested function or service. To this end, for example, cloud computing, distributed computing, or client-server computing may be used.

Figure 10:
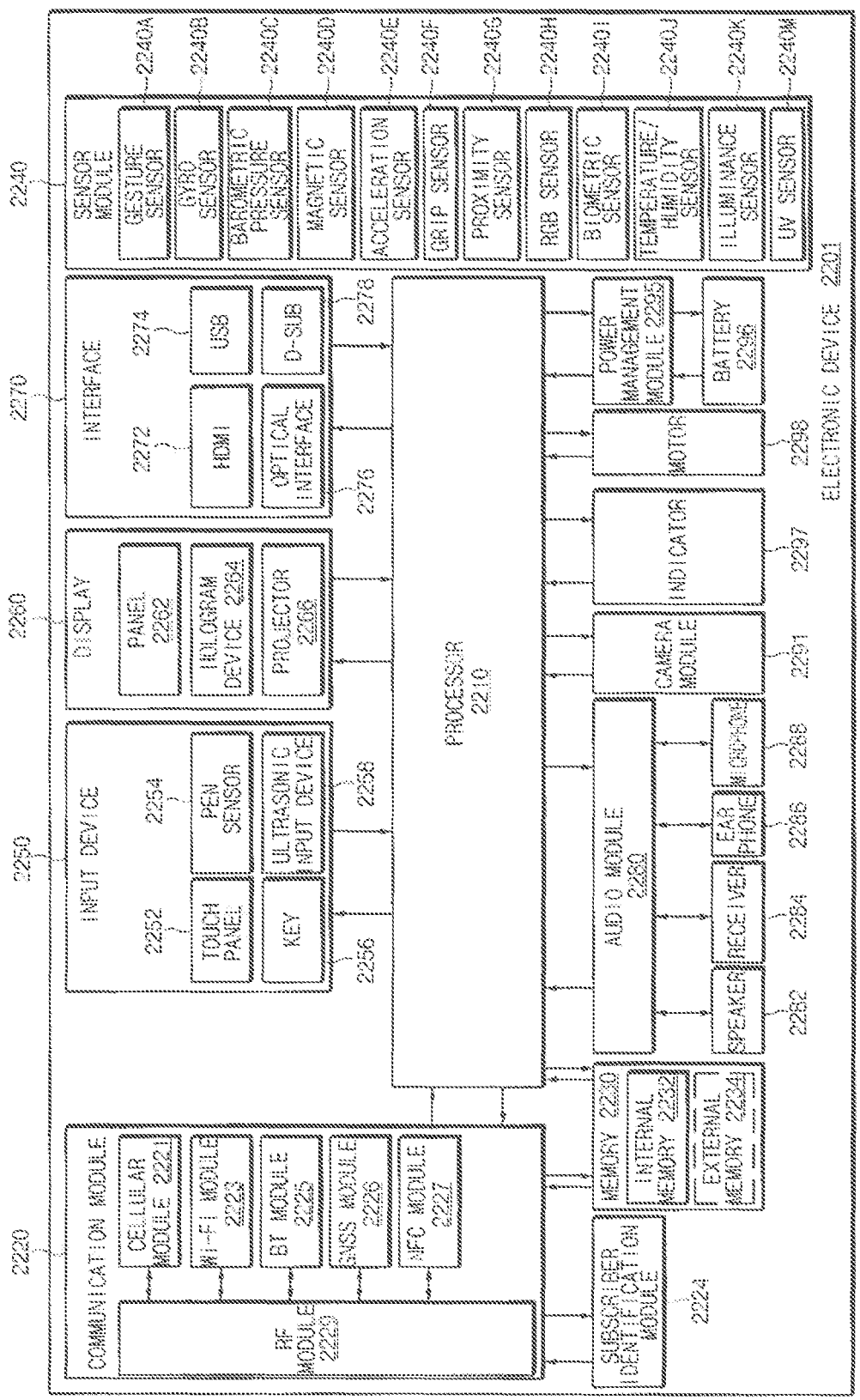
FIG. 10 is a block diagram of an electronic apparatus according to various embodiments.

FIG. 10 illustrates a block diagram of an electronic apparatus 2201, according to various embodiments. An electronic apparatus 2201 may include, for example, all or a part of the electronic apparatus 2101 illustrated in FIG. 9. The electronic apparatus 2201 may include one or more processors (e.g., an application processor (AP)) 2210, a communication module 2220, a subscriber identification module 2224, a memory 2230, a sensor module 2240, an input device 2250, a display 2260, an interface 2270, an audio module 2280, a camera module 2291, a power management module 2295, a battery 2296, an indicator 2297, and a motor 2298. The processor 2210 may drive, for example, an operating system (OS) or an application to control a plurality of hardware or software components connected to the processor 2210 and may process and compute a variety of data. For example, the processor 2210 may be implemented with a System on Chip (SoC). According to an embodiment, the processor 2210 may further include a graphic processing unit (GPU) and/or an image signal processor. The processor 2210 may include at least a part (e.g., a cellular module 2221) of components illustrated in FIG. 10. The processor 2210 may load a command or data, which is received from at least one of other components (e.g., a nonvolatile memory), into a volatile memory and process the loaded instruction or data. The processor 2210 may store result data in the nonvolatile memory.

The communication module 2220 may be configured the same as or similar to the communication interface 2170 of FIG. 9. The communication module 2220 may include the cellular module 2221, a Wi-Fi module 2223, a Bluetooth (BT) module 2225, a GNSS module 2227, a near field communication (NFC) module 2228, and a radio frequency (RF) module 2229. The cellular module 2221 may provide, for example, voice communication, video communication, a character service, an Internet service, or the like over a communication network. According to an embodiment, the cellular module 2221 may perform discrimination and authentication of the electronic apparatus 2201 within a communication network by using the subscriber identification module (e.g., a SIM card) 2224. According to an embodiment, the cellular module 2221 may perform at least a portion of functions that the processor 2210 provides. According to an embodiment, the cellular module 2221 may include a communication processor (CP). According to an embodiment, at least a part (e.g., two or more) of the cellular module 2221, the Wi-Fi module 2223, the BT module 2225, the GNSS module 2227, or the NFC module 2228 may be included within one Integrated Circuit (IC) or an IC package. For example, the RF module 2229 may transmit and receive a communication signal (e.g., an RF signal). For example, the RF module 2229 may include a transceiver, a power amplifier module (PAM), a frequency filter, a low noise amplifier (LNA), an antenna, or the like. According to another embodiment, at least one of the cellular module 2221, the Wi-Fi module 2223, the BT module 2225, the GNSS module 2227, or the NFC module 2228 may transmit and receive an RF signal through a separate RF module. The subscriber identification module 2224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 2230 (e.g., the memory 2130) may include an internal memory 2232 or an external memory 2234. For example, the internal memory 2232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 2234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 2234 may be operatively and/or physically connected to the electronic apparatus 2201 through various interfaces.

The sensor module 2240 may measure, for example, a physical quantity or may detect an operation state of the electronic apparatus 2201. The sensor module 2240 may convert the measured or detected information to an electric signal. For example, the sensor module 2240 may include at least one of a gesture sensor 2240A, a gyro sensor 2240B, a barometric pressure sensor 2240C, a magnetic sensor 2240D, an acceleration sensor 2240E, a grip sensor 2240F, the proximity sensor 2240G, a color sensor 2240H (e.g., red, green, blue (RGB) sensor), a biometric sensor 2240I, a temperature/humidity sensor 2240J, an illuminance sensor 2240K, or an UV sensor 2240M. Although not illustrated, additionally or alternatively, the sensor module 2240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling at least one or more sensors included therein. According to an embodiment, the electronic apparatus 2201 may further include a processor that is a part of the processor 2210 or independent of the processor 2210 and is configured to control the sensor module 2240. The processor may control the sensor module 2240 while the processor 2210 remains at a sleep state.

The input device 2250 may include, for example, a touch panel 2252, a (digital) pen sensor 2254, a key 2256, or an ultrasonic input unit 2258. For example, the touch panel 2252 may use at least one of capacitive, resistive, infrared and ultrasonic detecting methods. Also, the touch panel 2252 may further include a control circuit. The touch panel 2252 may further include a tactile layer to provide a tactile reaction to a user. The (digital) pen sensor 2254 may be, for example, a part of a touch panel or may include an additional sheet for recognition. The key 2256 may include, for example, a physical button, an optical key, or a keypad. The ultrasonic input device 2258 may detect (or sense) an ultrasonic signal, which is generated from an input device, through a microphone (e.g., a microphone 2288) and may check data corresponding to the detected ultrasonic signal.

The display 2260 (e.g., the display 101) may include a panel 2262, a hologram device 2264, a projector 2266, and/or a control circuit for controlling the panel 2262, the hologram device 2264, or the projector 2266. The panel 2262 may be implemented, for example, to be flexible, transparent or wearable. The panel 2262 and the touch panel 2252 may be integrated into a single module. According to an embodiment, the panel 2262 may include a pressure sensor (or force sensor) that measures the intensity of touch pressure by a user. The pressure sensor may be implemented integrally with the touch panel 2252, or may be implemented as at least one sensor separately from the touch panel 2252. The hologram device 2264 may display a stereoscopic image in a space using a light interference phenomenon. The projector 2266 may project light onto a screen so as to display an image. For example, the screen may be arranged in the inside or the outside of the electronic apparatus 2201. The interface 2270 may include, for example, a high-definition multimedia interface (HDMI) 2272, a universal serial bus (USB) 2274, an optical interface 2276, or a D-subminiature (D-sub) 2278. The interface 2270 may be included, for example, in the communication interface 2170 illustrated in FIG. 9. Additionally or alternatively, the interface 2270 may include, for example, a mobile high definition link (MHL) interface, a SD card/multi-media card (MMC) interface, or an infrared data association (IrDA) standard interface.

The audio module 2280 may convert a sound and an electric signal in dual directions. At least a component of the audio module 2280 may be included, for example, in the input/output interface 2150 illustrated in FIG. 9. The audio module 2280 may process, for example, sound information that is input or output through a speaker 2282, a receiver 2284, an earphone 2286, or the microphone 2288. For example, the camera module 2291 may shoot a still image or a video. According to an embodiment, the camera module 2291 may include at least one or more image sensors (e.g., a front sensor or a rear sensor), a lens, an image signal processor (ISP), or a flash (e.g., an LED or a xenon lamp). The power management module 2295 may manage, for example, power of the electronic apparatus 2201. According to an embodiment, a power management integrated circuit (PMIC), a charger IC, or a battery or fuel gauge may be included in the power management module 2295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 2296 and a voltage, current or temperature thereof while the battery is charged. The battery 2296 may include, for example, a rechargeable battery and/or a solar battery.

The indicator 2297 may display a specific state of the electronic apparatus 2201 or a part thereof (e.g., the processor 2210), such as a booting state, a message state, a charging state, and the like. The motor 2298 may convert an electrical signal into a mechanical vibration and may generate the following effects: vibration, haptic, and the like. The electronic apparatus 2201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned components of the electronic apparatus according to various embodiments of the disclosure may be configured with one or more components, and the names of the components may be changed according to the type of the electronic apparatus. In various embodiments, some components of the electronic apparatus (e.g., the electronic apparatus 2201) may be omitted or other additional components may be added. Furthermore, some of the components of the electronic apparatus may be combined with each other so as to form one entity, so that the functions of the components may be performed in the same manner as before the combination.

Figure 11:
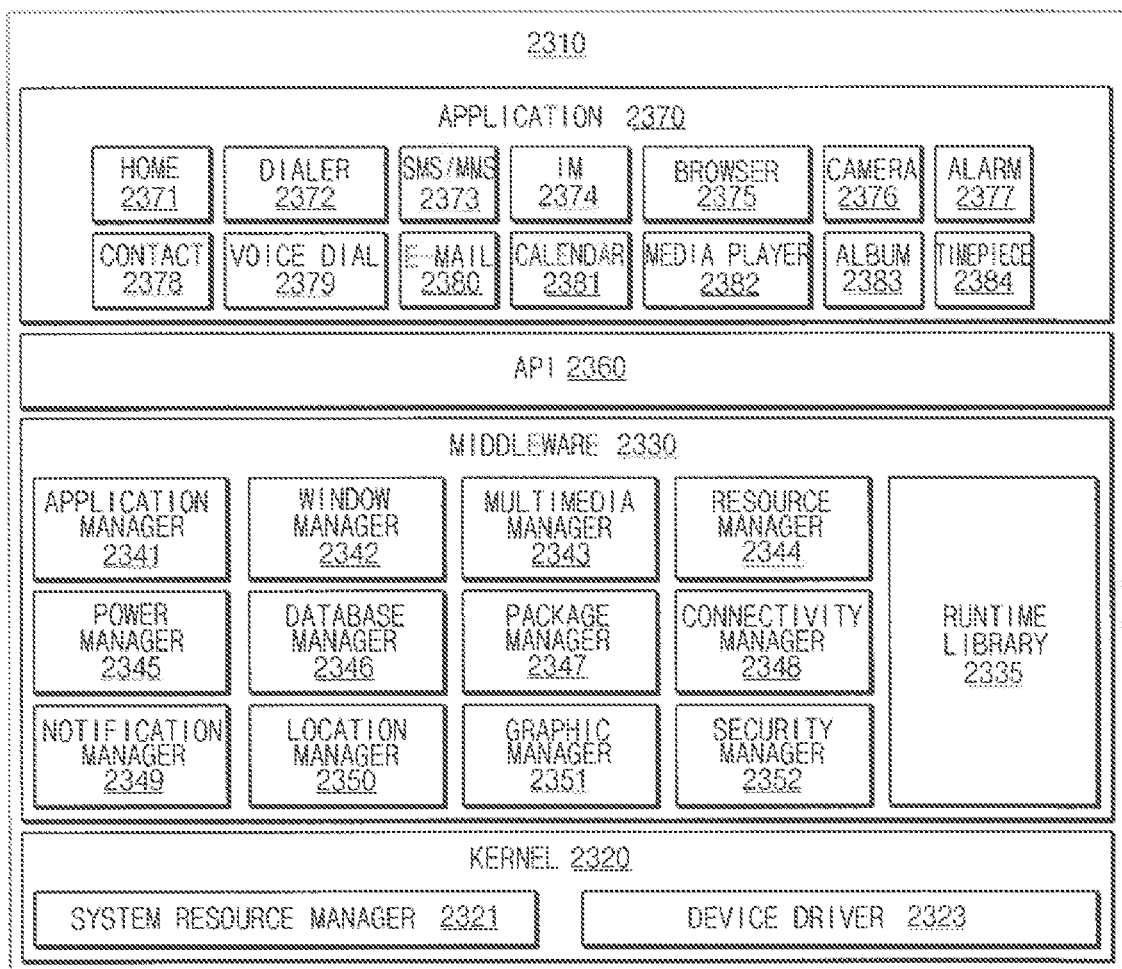
FIG. 11 is a block diagram of a program module according to various embodiments.

FIG. 11 illustrates a block diagram of a program module, according to various embodiments. According to an embodiment, a program module 2310 (e.g., the program 2140) may include an operating system (OS) to control resources associated with an electronic apparatus (e.g., the electronic apparatus 2101), and/or diverse applications (e.g., the application program 2147) driven on the OS. The OS may be, for example, Android™, iOS™, Windows™, Symbian™, Tizen™, or Bada™. Referring to FIG. 11, the program module 2310 may include a kernel 2320 (e.g., the kernel 2141), a middleware 2330 (e.g., the middleware 2143), an application programming interface (API) 2360 (e.g., the API 2145), and/or an application 2370 (e.g., the application program 2147). At least a portion of the program module 2310 may be preloaded on an electronic apparatus or may be downloadable from an external electronic apparatus (e.g., the first electronic apparatus 2102, the second electronic apparatus 2104, the server 2106, or the like).

The kernel 2320 (e.g., the kernel 2141) may include, for example, a system resource manager 2321 or a device driver 2323. The system resource manager 2321 may control, allocate, or retrieve system resources. According to an embodiment, the system resource manager 2321 may include a process managing unit, a memory managing unit, a file system managing unit, or the like. The device driver 2323 may include, for example, a display driver, a camera driver, a Bluetooth driver, a shared memory driver, a USB driver, a keypad driver, a Wi-Fi driver, an audio driver, or an inter-process communication (IPC) driver. The middleware 2330 may provide, for example, a function that the application 2370 needs in common, or may provide diverse functions to the application 2370 through the API 2360 to allow the application 2370 to efficiently use limited system resources of the electronic apparatus. According to an embodiment, the middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include, for example, a library module that is used by a compiler to add a new function through a programming language while the application 2370 is being executed. The runtime library 2335 may perform input/output management, memory management, or capacities about arithmetic functions. The application manager 2341 may manage, for example, a life cycle of at least one application of the application 2370. The window manager 2342 may manage a graphic user interface (GUI) resource that is used in a screen. The multimedia manager 2343 may identify a format necessary for playing diverse media files, and may perform encoding or decoding of media files by using a codec suitable for the format. The resource manager 2344 may manage resources such as a memory space or source code of the application 2370. The power manager 2345 may manage a battery or power, and may provide power information for an operation of an electronic apparatus. According to an embodiment, the power manager 2345 may operate with a basic input/output system (BIOS). The database manager 2346 may generate, search for, or modify database that is to be used in the application 2370. The package manager 2347 may install or update an application that is distributed in the form of package file.

The connectivity manager 2348 may manage, for example, wireless connection. The notification manager 2349 may provide an event, for example, arrival message, appointment, or proximity notification to a user. For example, the location manager 2350 may manage location information about an electronic apparatus. The graphic manager 2351 may manage a graphic effect that is provided to a user, or manage a user interface relevant thereto. The security manager 2352 may provide, for example, system security or user authentication. According to an embodiment, the middleware 2330 may include a telephony manager for managing a voice or video call function of the electronic apparatus or a middleware module that combines diverse functions of the above-described components. According to an embodiment, the middleware 2330 may provide a module specialized to each OS kind to provide differentiated functions. Additionally, the middleware 2330 may dynamically remove a part of the preexisting components or may add new components thereto. The API 2360 may be, for example, a set of programming functions and may be provided with a configuration that is variable depending on an OS. For example, in the case where an OS is the android or iOS, it may provide one API set per platform. In the case where an OS is Tizen, it may provide two or more API sets per platform.

The application 2370 may include, for example, applications such as a home 2371, a dialer 2372, an SMS/MMS 2373, an instant message (IM) 2374, a browser 2375, a camera 2376, an alarm 2377, a contact 2378, a voice dial 2379, an e-mail 2380, a calendar 2381, a media player 2382, an album 2383, a timepiece 2384, health care (e.g., measuring an exercise quantity, blood sugar, or the like) or offering of environment information (e.g., information of barometric pressure, humidity, temperature, or the like). According to an embodiment, the application 2370 may include an information exchanging application to support information exchange between an electronic apparatus and an external electronic apparatus. The information exchanging application may include, for example, a notification relay application for transmitting specific information to an external electronic apparatus, or a device management application for managing the external electronic apparatus. For example, the notification relay application may include a function of transmitting notification information, which arise from other applications, to an external electronic apparatus or may receive, for example, notification information from an external electronic apparatus and provide the notification information to a user. The device management application may install, delete, or update for example, a function (e.g., turn-on/turn-off of an external electronic apparatus itself (or a part of components) or adjustment of brightness (or resolution) of a display) of the external electronic apparatus which communicates with the electronic apparatus, and an application running in the external electronic apparatus. According to an embodiment, the application 2370 may include an application (e.g., a health care application of a mobile medical device) that is assigned in accordance with an attribute of an external electronic apparatus. According to an embodiment, the application 2370 may include an application that is received from an external electronic apparatus. At least a portion of the program module 2310 may be implemented by software, firmware, hardware (e.g., the processor 2210), or a combination (e.g., execution) of two or more thereof, and may include modules, programs, routines, sets of instructions, processes, or the like for performing one or more functions.

The term "module" used in this disclosure may include a unit composed of hardware, software and firmware and may be interchangeably used with the terms "unit", "logic", "logical block", "part" and "circuit". The "module" may be an integrated part or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 2130) in the form of a program module. The instruction, when executed by a processor (e.g., the processor 2120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, the one or more instructions may contain a code made by a compiler or a code executable by an interpreter. A module or a program module according to various embodiments may include at least one of the above components, or a part of the above components may be omitted, or other components may be further included. Operations performed by a module, a program module, or other components according to various embodiments may be executed sequentially, in parallel, repeatedly, or in a heuristic method or some operations may be executed in different sequences or may be omitted. Alternatively, other operations may be added.

The invention claimed is:

1. An electronic apparatus comprising:
 a display;
 at least one speaker;
 a communication module; and
 at least one processor electrically connected to the display, the speaker, and the communication module,
 wherein the at least one processor is configured to:
 receive information about a region displayed by an external electronic apparatus playing the same image as an image played on the display by the electronic apparatus, in the image via the communication module;
 receive voice data generated by the external electronic apparatus, via the communication module; and
 adjust an output of the speaker based on a distance difference between a region displayed by the external electronic apparatus and a region displayed on the display by the electronic apparatus to control the voice data to be played.

2. The electronic apparatus of claim 1, wherein the at least one processor is configured to:
 when a distance difference between a region displayed by the external electronic apparatus and a region displayed on the display by the electronic apparatus increases, control the output of the speaker to be high.

3. The electronic apparatus of claim 1, wherein the at least one processor is configured to:
 when a distance difference between a region displayed by the external electronic apparatus and a region displayed on the display by the electronic apparatus decreases, control the output of the speaker to be low.

4. The electronic apparatus of claim 1, wherein the electronic apparatus further comprises:
 a sensor module or an input device,
 wherein the at least one processor is configured to:
 control a region displayed on the display by the electronic apparatus to be changed, based on a change in an input value entered via the sensor module or the input device.

5. The electronic apparatus of claim 4, wherein the sensor module includes at least one of a gesture sensor, a gyro sensor, or an acceleration sensor, and
 wherein the input device includes at least one of a touch panel, a pen sensor, a key, or an ultrasonic input device.

6. The electronic apparatus of claim 1, wherein the at least one speaker includes a first speaker and a second speaker,
 wherein the at least one processor is configured to:
 differentially adjust outputs of the first speaker and the second speaker, based on a distance difference between a region displayed by the external electronic apparatus and a region displayed on the display by the electronic apparatus.

7. The electronic apparatus of claim 1, wherein the at least one processor is configured to:
 when enlarging and displaying a part of a region displayed by the external electronic apparatus, adjust the output of the speaker to be high, based on an enlarged ratio.

8. The electronic apparatus of claim 1, wherein the at least one processor is configured to:
when reducing and displaying a part of a region displayed by the external electronic apparatus, adjust the output of the speaker to be low, based on a reduced ratio.

9. The electronic apparatus of claim 1, wherein the at least one processor is configured to:
when the electronic apparatus displays the image after being coupled to a wearable device, control a region displayed in the image to be changed and displayed based on movement of the wearable device.

10. A controlling method of an electronic apparatus, the controlling method comprising:
receiving information about a region displayed by an external electronic apparatus playing the same image as an image played by the electronic apparatus, in the image;
receiving voice data generated by the external electronic apparatus; and
adjusting and playing an output of the received voice data based on a distance difference between a region displayed by the external electronic apparatus and a region displayed on a display by the electronic apparatus.

11. The controlling method of claim 10, wherein the adjusting and the playing of the output of the received voice data based on the distance difference between the region displayed by the external electronic apparatus and the region displayed on the display by the electronic apparatus includes:
when a distance difference between a region displayed by the external electronic apparatus and a region displayed on the display by the electronic apparatus increases, increasing the output of the received voice data.

12. The controlling method of claim 10, wherein the adjusting and the playing of the output of the received voice data based on the distance difference between the region displayed by the external electronic apparatus and the region displayed on the display by the electronic apparatus includes:
when a distance difference between a region displayed by the external electronic apparatus and a region displayed on the display by the electronic apparatus decreases, decreasing the output of the received voice data.

13. The controlling method of claim 10, wherein the electronic apparatus further includes a sensor module or an input device, and
wherein the controlling method comprises:
changing a region displayed on the display by the electronic apparatus, based on a change in an input value entered via the sensor module or the input device.

14. The controlling method of claim 10, wherein the electronic apparatus includes a first speaker and a second speaker, and
wherein the adjusting and the playing of the output of the received voice data based on the distance difference between the region displayed by the external electronic apparatus and the region displayed on the display by the electronic apparatus includes:
differentially adjusting outputs of the first speaker and the second speaker, based on a distance difference between a region displayed by the external electronic apparatus and a region displayed on the display by the electronic apparatus.

15. The controlling method of claim 10, wherein the controlling method comprises:
when the electronic apparatus displays the image after being coupled to a wearable device, changing and displaying a region displayed in the image, based on movement of the wearable device.

* * * * *